(12) United States Patent
Hayashi

(10) Patent No.: US 6,940,794 B2
(45) Date of Patent: Sep. 6, 2005

(54) INFORMATION RECORDING/REPRODUCING APPARATUS THAT DETERMINES THE NUMBER OF RECORDING LAYERS OF AN INFORMATION RECORDING MEDIUM

(75) Inventor: Hideki Hayashi, Nara (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 250 days.

(21) Appl. No.: 10/211,789

(22) Filed: Aug. 2, 2002

(65) Prior Publication Data

US 2004/0022152 A1 Feb. 5, 2004

(30) Foreign Application Priority Data

Aug. 3, 2001 (JP) .......................................... 2001-236028

(51) Int. Cl.⁷ .............................................. G11B 7/125
(52) U.S. Cl. ................ 369/47.5; 369/47.52; 369/44.24
(58) Field of Search ............................... 369/53.2, 44.23, 369/44.24, 53.41, 47.52, 47.5

(56) References Cited

U.S. PATENT DOCUMENTS

| | | | | |
|---|---|---|---|---|
| 5,097,464 A | * | 3/1992 | Nishiuchi et al. ...... | 369/112.29 |
| 5,615,186 A | * | 3/1997 | Rosen et al. ............. | 369/44.24 |
| 5,798,994 A | * | 8/1998 | Kamatani .................. | 369/53.2 |
| 5,892,739 A | * | 4/1999 | DeCusatis et al. ........ | 369/44.13 |
| 5,910,937 A | * | 6/1999 | Akiba et al. ................ | 369/118 |
| 6,049,518 A | * | 4/2000 | Tsuchiya et al. ........ | 369/112.02 |
| 6,058,082 A | * | 5/2000 | Hwang ..................... | 369/44.27 |
| 6,072,757 A | * | 6/2000 | Tajiri .......................... | 369/53.2 |
| 6,295,260 B1 | * | 9/2001 | Shihara et al. ............. | 369/53.2 |

FOREIGN PATENT DOCUMENTS

| | | |
|---|---|---|
| JP | 6-28700 | 2/1994 |
| JP | 6-131683 | 5/1994 |
| JP | 2000-195086 | 7/2000 |

* cited by examiner

Primary Examiner—Brian E. Miller
Assistant Examiner—Michael V. Battaglia
(74) Attorney, Agent, or Firm—Renner, Otto, Boisselle & Sklar, LLP

(57) ABSTRACT

An information recording/reproducing apparatus of the present invention includes: a light source for emitting a first light beam having a predetermined light power $P_{pre}$; a determination section for determining the number of recording layers included in the information recording medium; a light beam transmission adjustment section for adjusting the quantity of the first light beam transmitted therethrough; and a light condensing section for condensing the first light beam on the information recording medium. When the information recording medium has one recording layer, the adjustment section adjusts the predetermined light power $P_{pre}$ so as to be a first light power $P_1$. When the information recording medium has two recording layers, the adjustment section adjusts the predetermined light power $P_{pre}$ so as to be a second light power $P_2$. The predetermined light power $P_{pre}$, the first light power $P_1$, and the second light power $P_2$ satisfy the relationship of $P_1 < P_2 \leq P_{pre}$.

20 Claims, 6 Drawing Sheets

INFORMATION RECORDING/REPRODUCING APPARATUS THAT DETERMINES THE NUMBER OF RECORDING LAYERS OF AN INFORMATION RECORDING MEDIUM

BACKGROUND OF THE INVENTION

1. Field of the Invention

The present invention relates to an information recording/reproducing apparatus for recording information in an information recording medium having a single recording layer or a plurality of recording layers, and for reproducing the information recorded in the information recording medium.

2. Description of the Related Art

A digital versatile disc (DVD) is a well-known information recording medium (optical disc) which can store a large quantity of data. For example, it can store digital information at a recording density about 6 times greater than that of a compact disc (CD). In recent years, as the amount of information to be recorded in an information recording medium has increased, there has been demand for an information recording medium having a larger recording capacity. In order to increase the recording capacity of an information recording medium, it is necessary to increase the information recording density by reducing the size of a spot of light which is emitted on an information recording medium when recording information in, or reproducing information from, the information recording medium. For example, the size of the light spot can be reduced by using laser light having a shorter wavelength and increasing the numerical aperture (NA) of an objective lens of an optical pickup. In an existing DVD recording/reproducing apparatus, a light source having a wavelength of 660 nm and an objective lens having a NA of 0.6 are generally used. For example, a blue light laser having a wavelength of 405 nm and an objective lens having a NA of 0.85 can achieve a recording density 5 times greater than the currently-achieved DVD recording density.

In addition to development of a recording/reproducing apparatus which uses a blue light laser having a shorter wavelength, an information recording medium having a plurality of recording layers, which may achieve a 2 times greater recording density, has been developed. If an optical disc having a two recording layers is realized in addition to a reduction of laser light wavelength and an increase in the NA of objective lens, a recording density about 10 times greater than that of an existing DVD having a single recording layer can be achieved.

However, in a high-density optical disc apparatus which uses a blue light laser as a light source, a margin of the power of light generated by a blue light laser for reproduction is very small, and a light source for such a blue light laser has a problem of quantum noise. An optical head which addresses the problem of quantum noise is disclosed in Japanese Laid-Open Publication No. 2000-195086. The optical head disclosed in this document can perform high quality reproduction while the light power on a surface of an optical disc is kept low, and deterioration of an optical disc and erroneous data deletion are prevented, and the amount of quantum noise in a semiconductor laser is kept small.

FIG. 6 shows a structure of a prior art optical head 600.

The optical head 600 includes a light source 161, an intensity filter 162, a beam splitter 163, a collimator lens 164, a mirror 165, an objective lens 166, a multi-lens 168, and a photodiode 169.

The light source 161 is a GaN-based semiconductor laser which emits blue light. The light source 161 also emits coherent light used for recording/reproduction in a recording layer of an optical disc 167.

The intensity filter 162 is an optical element including an absorber film which absorbs light. In the optical system illustrated in FIG. 6, the intensity filter 162 can be mechanically inserted in or removed from the optical path of the optical system.

The beam splitter 163 is an optical element which splits a light beam emitted by the light source 161. The collimator lens 164 is a lens for converting the light beam emitted by the light source 161 into parallel light. The mirror 165 is an optical element which reflects an incoming light beam and directs the reflected light beam to the optical disc 167. An objective lens 166 is a lens for condensing the light beam onto a recording layer of the optical disc 167. The multi-lens 168 is a lens for condensing the light beam onto the photodiode 169. The photodiode 169 receives the light beam reflected by a recording layer of the optical disc 167 and converts it into an electric signal.

Next, an operation of the optical head 600 is described.

When information is recorded on the optical disc 167, the intensity filter 162 is out of the optical path of the optical system. The light source 161 emits a light beam which is modulated according to information to be recorded. The light beam is reflected by the beam splitter 163 and converted into parallel light by the collimator lens 164. Then, the light beam is reflected by the mirror 165 and transmitted through the objective lens 166 so as to be condensed on the optical disc 167 (i.e., a light spot is formed on the optical disc 167). The state of the recording layer in the light spot portion is changed (for example, the crystalline state of the light spot portion is changed) according to the information to be recorded, whereby information is recorded on the optical disc 167 as a change in the state of the recording layer.

In the case of reproducing information recorded in the optical disc 167, the intensity filter 162 is placed in the optical path. The light source 161 emits an unmodulated light beam. The light beam emitted by the light source 161 is transmitted through the intensity filter 162 so that the amount of light (power) of the light beam is attenuated. The attenuated light beam is reflected by the beam splitter 163 and converted into parallel light by the collimator lens 164. Then, the light beam is reflected by the mirror 165 and transmitted through the objective lens 166 so as to be condensed on the optical disc 167. The light beam is reflected by the recording layer of the optical disc 167 at a reflectance according to the state of the recording layer. The light beam reflected by the recording layer is transmitted through the objective lens 166 and reflected by the mirror 165 again. Thereafter, the light beam is transmitted through the collimator lens 164 and the multi-lens 168 so as to be condensed onto the photodiode 169. The photodiode 169 extracts: an information signal which indicates information recorded on the optical disc 167; a focusing error signal which indicates a focusing state of the light beam on the optical disc 167 using an astigmatism method; and a tracking error signal which indicates the irradiation position of the light beam. A focus control section (not shown) controls the position of the objective lens 166 along the optical axis direction based on the focus error signal, thereby condensing the light beam onto the optical disc 167 in a focused state. A tracking control section (not shown) controls the position of the objective lens 166 in a direction perpendicular to the optical axis direction based on the tracking error signal, thereby condensing the light beam onto a desired track of the optical disc 167. The photodiode 169 also reproduces the information signal. By such an operation, information recorded in the optical disc 167 is reproduced.

The prior art optical head 600 can set the light power of the light source 161 to a level such that the quantum noise is kept sufficiently small during a reproduction operation, and can reproduce information while the light power at a surface of an optical disc is kept low such that deterioration of the optical disc and erroneous deletion of data can be prevented. On the other hand, during a recording operation, the optical head 600 can perform recording of data without reducing the light power of the light source 161.

However, in the optical head 600 having the above structure, it is necessary to mechanically insert the intensity filter 162 in or remove the intensity filter 162 from the optical path when the operation mode is switched between recording and reproduction operations. When a recording operation is performed immediately after reproduction is performed at an address of the optical disc 167, the speed of moving the intensity filter 162 is a problem to be considered. For example, in a next-generation high-density optical disc which has a higher recording density than that of a DVD, it is necessary to perform switching of the operation mode within about 100 nanoseconds. However, such a quick switching is impossible with the optical head 600 because the intensity filter 162 is mechanically inserted in or removed from the optical path in the optical head 600. Even when a liquid crystal device is used as the intensity filter 162, it is difficult to achieve such a quick switching of the operation mode.

Furthermore, in the case of recording/reproducing information in/from a information recording medium having one type of recording sensitivity (i.e., a recording medium having one recording layer), a semiconductor laser of a certain type can emit a light beam with reduced quantum noise onto an information recording medium without reducing the light power of the light beam by an intensity filter during a reproduction operation. However, in the case where information recording media having different recording sensitivities, for example, an information recording medium having a single recording layer and an information recording medium having two recording layers are recorded or reproduced using the same optical head, it is difficult to reduce the quantum noise of the light beam. In general, a light beam used for recording/reproducing information in an information recording medium having two recording layers requires light power about 2 times greater than that required for a light beam used for recording/reproducing information in an information recording medium having a single recording layer. It is difficult to obtain a light beam with reduced quantum noise for reproducing information from an information recording medium having a single recording layer while obtaining the light power of the light beam required for recording the information recording medium having two recording layers.

SUMMARY OF THE INVENTION

According to one aspect of the present invention, there is provided an information recording/reproducing apparatus for recording information on an information recording medium having one or two recording layers and for reproducing the information recorded on the information recording medium, comprising: a light source for emitting a first light beam having a predetermined light power $P_{pre}$; a determination section for determining whether the information recording medium has one recording layer or two recording layers; a light beam transmission adjustment section for adjusting the quantity of the first light beam transmitted therethrough based on a determination result of the determination section; and a light condensing section for condensing the first light beam transmitted through the light beam transmission adjustment section on the information recording medium, wherein when the determination section determines that the information recording medium has one recording layer, the light beam transmission adjustment section adjusts the predetermined light power $P_{pre}$ so as to be a first light power $P_1$, when the determination section determines that the information recording medium has two recording layers, the light beam transmission adjustment section adjusts the predetermined light power $P_{pre}$ so as to be a second light power $P_2$, and the predetermined light power $P_{pre}$, the first light power $P_1$, and the second light power $P_2$ satisfy the relationship of $P_1 < P_2 \leq P_{pre}$.

In one embodiment of the present invention, the light source emits a second light beam having a light power smaller than the predetermined light power $P_{pre}$ instead of the first light beam; and the determination section detects a light quantity of the second light beam which is transmitted through the light beam transmission adjustment section and reflected by the information recording medium, and determines whether the information recording medium has one recording layer or two recording layers according to the reflected light quantity.

In another embodiment of the present invention, the determination section compares a signal voltage $V_P$ indicating the reflected light quantity with a reference voltage $V_{Pth}$ so as to determine whether the information recording medium has one recording layer or two recording layers; when the signal voltage $V_P$ and the reference voltage $V_{Pth}$ satisfy the relationship of $V_P > V_{Pth}$, the determination section determines that the information recording medium has one recording layer, and when the signal voltage $V_P$ and the reference voltage $V_{Pth}$ satisfy the relationship of $V_P < V_{Pth}$, the determination section determines that the information recording medium has two recording layers.

In still another embodiment of the present invention, the determination section compares a variation number m of a signal voltage indicating the reflected light quantity with a reference variation number so as to determine whether the information recording medium has one recording layer or two recording layers, the reference variation number including a first reference variation number $m_1$ and a second reference variation number $m_2$ ($m_1 < m_2$); when the variation number m and the reference variation number satisfy the relationship of $m = m_1$, the determination section determines that the information recording medium has one recording layer, and when the variation number m and the reference variation number satisfy the relationship of $m = m_2$, the determination section determines that the information recording medium has two recording layers.

In still another embodiment of the present invention, the determination section compares a signal voltage indicating the reflected light quantity with a first signal voltage and a second signal voltage so as to determine whether the information recording medium has one recording layer or two recording layers; the first signal voltage indicates a light quantity of the second light beam reflected by the information recording medium having one recording layer; the second signal voltage indicates a light quantity of the second light beam reflected by the information recording medium having two recording layers; when the signal voltage is equal to the first signal voltage, the determination section determines that the information recording medium has one recording layer, and when the signal voltage is equal to the second signal voltage, the determination section determines that the information recording medium has two recording layers.

In still another embodiment of the present invention, the light beam transmission adjustment section includes a liquid crystal device and a polarization hologram.

In still another embodiment of the present invention, the light beam transmission adjustment section includes a liquid crystal device and a polarized beam splitter.

In still another embodiment of the present invention, the light beam transmission adjustment section includes an optical filter.

In still another embodiment of the present invention, the light source is a semiconductor laser which emits light at a wavelength within a wavelength region from green to ultraviolet.

In still another embodiment of the present invention, the light source is a semiconductor laser which emits light at a wavelength within a blue wavelength region.

According to another aspect of the present invention, there is provided an information recording/reproducing apparatus for recording information on an information recording medium having one, two, or N recording layers (N>2; N is a natural number) and for reproducing the information recorded on the information recording medium, comprising: a light source for emitting a first light beam having a predetermined light power $P_{pre}$; a determination section for determining the number of recording layers included in the information recording medium; a light beam transmission adjustment section for adjusting the quantity of the first light beam transmitted therethrough based on a determination result of the determination section; and a light condensing section for condensing the first light beam transmitted through the light beam transmission adjustment section on the information recording medium, wherein when the determination section determines that the information recording medium has n recording layers (n=1, 2, ..., N; n is a natural number), the light beam transmission adjustment section adjusts the predetermined light power $P_{pre}$ so as to be a nth light power $P_n$, and the predetermined light power $P_{pre}$ and the nth light power $P_n$ satisfy the relationship of $P_1 < P_2 < \ldots < P_n < \ldots < P_{N-1} \leq P_N$.

In one embodiment of the present invention, the light source emits a second light beam having a light power smaller than the predetermined light power $P_{pre}$ instead of the first light beam; and the determination section detects a light quantity of the second light beam which is transmitted through the light beam transmission adjustment section and reflected by the information recording medium, and determines the number of recording layers included in the information recording medium according to the reflected light quantity.

In another embodiment of the present invention, the determination section compares a signal voltage $V_P$ indicating the reflected light quantity with a reference voltage $V_{Pthn}$ so as to determine the number of recording layers included in the information recording medium; the reference voltage $V_{Pthn}$ includes a first reference voltage $V_{Pth1}$, a second reference voltage $V_{Pth2}$, ..., and a (N-1)th reference voltage $V_{PthN-1}$, which satisfy the relationship of $V_{Pth1} > V_{Pth2} > \ldots > V_{PthN-1}$; when the signal voltage $V_P$ and the reference voltage $V_{Pthn}$ satisfy the relationship of $V_P > V_{Pth1}$, the determination section determines that the information recording medium has one recording layer, when the signal voltage $V_P$ and the reference voltage $V_{Pthn}$ satisfy the relationship of $V_P < V_{PthN-1}$, the determination section determines that the information recording medium has N recording layers, and when the signal voltage $V_P$ and the reference voltage $V_{Pthn}$ satisfy the relationship of $V_{Pthk-1} > V_P > V_{Pthk}$, the determination section determines that the information recording medium has k recording layers (k=2, 3, ..., N-1; k is a natural number).

In still another embodiment of the present invention, the determination section compares a variation number m of a signal voltage indicating the reflected light quantity with a reference variation number so as to determine the number of recording layers included in the information recording medium; the reference variation number includes a first reference variation number $m_1$, a second reference variation number $m_2$, ..., and a Nth reference variation number $m_N$, which satisfy the relationship of $m_1 < m_2 < \ldots < m_N$; and when the variation number m of the signal voltage is equal to a nth variation number $m_n$ (n=1, 2, ..., N; n is a natural number) among the first to Nth variation numbers, the determination section determines that the information recording medium has n recording layers.

In still another embodiment of the present invention, the determination section compares a signal voltage indicating the reflected light quantity with first to Nth signal voltages so as to determine the number of recording layers included in the information recording medium; the nth signal voltage (n=1, 2, ..., N; n is a natural number) indicates a light quantity of the second light beam reflected by the information recording medium having n recording layers; and when the signal voltage is equal to the nth signal voltage, the determination section determines that the information recording medium has n recording layers.

In still another embodiment of the present invention, the light beam transmission adjustment section includes a liquid crystal device and a polarization hologram.

In still another embodiment of the present invention, the light beam transmission adjustment section includes a liquid crystal device and a polarized beam splitter.

In still another embodiment of the present invention, the light beam transmission adjustment section includes an optical filter.

In still another embodiment of the present invention, the light source is a semiconductor laser which emits light at a wavelength within a wavelength region from green to ultraviolet.

In still another embodiment of the present invention, the light source is a semiconductor laser which emits light at a wavelength within a blue wavelength region.

Thus, the invention described herein makes possible the advantages of (1) providing an information recording/reproducing apparatus which can emit a light beam for recording/reproducing information in/from an information recording medium having a plurality of recording layers such that the light power of the light beam is controlled according to the number of recording layers; and (2) changing the dynamic range of the light power of the light beam emitted from the information recording/reproducing apparatus without changing the dynamic range of the light power of the light beam emitted by a light source.

These and other advantages of the present invention will become apparent to those skilled in the art upon reading and understanding the following detailed description with reference to the accompanying figures.

DESCRIPTION OF THE PREFERRED EMBODIMENTS

Hereinafter, embodiments of the present invention will be described with reference to the drawings.

(Embodiment 1)

Figure 1:
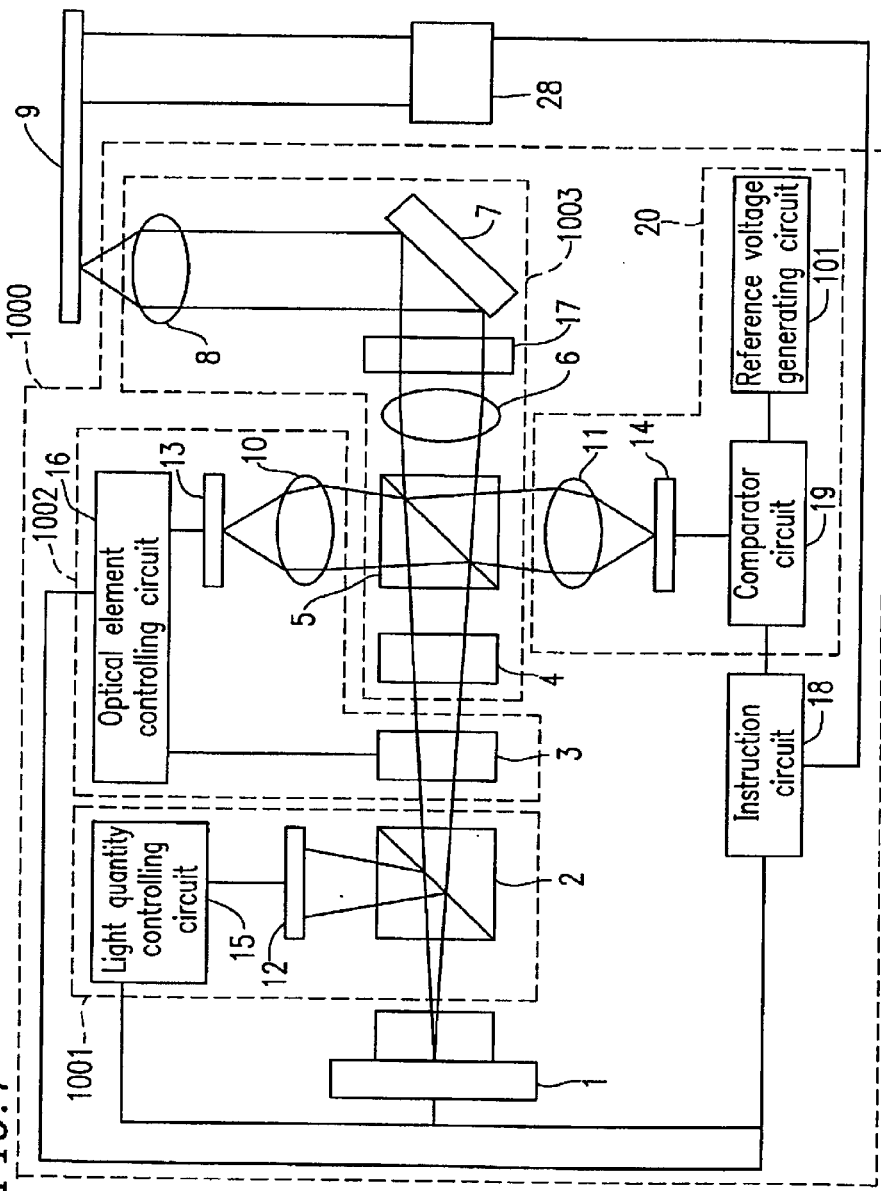
FIG. 1 shows a structure of an information recording/reproducing apparatus 1000 according to embodiment 1 of the present invention.

FIG. 1 shows a structure of an information recording/reproducing apparatus 1000 according to embodiment 1 of the present invention. The information recording/reproducing apparatus 1000 records information in or reproduces information from an information recording medium (optical disc) 9. The optical disc 9 has one recording layer (hereinafter, referred to as a "one-layer disc", or has two recording layers (hereinafter, referred to as a "two-layer disc").

1. Structure of Information Recording/Reproducing Apparatus 1000:

The information recording/reproducing apparatus 1000 includes a light source 1, an instruction circuit 18, a determination section 20, a light quantity adjustment section 1001, a light beam transmission adjustment section 1002, and a light condensing section 1003.

The light source 1 is a GaN-based semiconductor laser. The light source 1 emits a coherent light beam having a wavelength of 405 nm for recording/reproduction.

Now, the light source 1 is described in detail with reference to FIG. 2.

Figure 2:
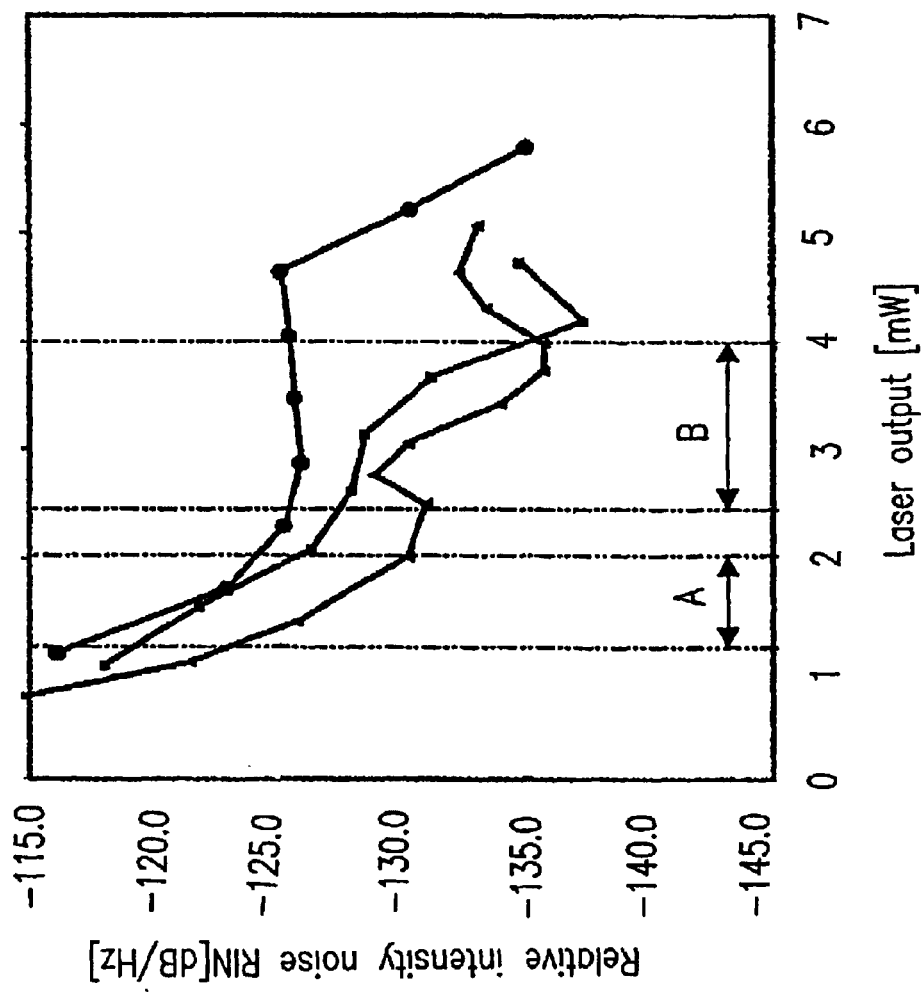
FIG. 2 shows the relationship between the laser output (light power) and quantum noise of a blue light semiconductor laser.

FIG. 2 shows the relationship between the laser output (light power) and the quantum noise in a blue light semiconductor laser. In FIG. 2, the horizontal axis represents the laser output of the light beam emitted by the semiconductor laser in milliwatts (mW). The vertical axis represents the quantum noise of the light beam emitted by the semiconductor laser as the relative intensity noise (RIN) in decibels per hertz (dB/Hz). Regarding the "relative intensity noise", see page 41 of *Optical Disc Technology* published by the Radio Technology Corporation. Three graphs of FIG. 2 (respectively represented by ●, ▲, and ■) show the characteristics of representative GaN-based semiconductor lasers.

In recent years, an increase of the output of a GaN-based semiconductor laser has been reported, and one report shows that the peak output exceeded 50 mW. In the case where a semiconductor laser which produces a peak output of 50 mW is used as a light source in an information recording/reproducing apparatus having a common head optical transmittance (i.e., about 25% laser output efficiency), the peak value of the light power of the light beam emitted from an optical head is 12.5 mW (=50 mW×25%). With this peak value, recording/reproduction on a two-layer disc can be performed. In such a case, the light power of the light beam used for reproducing information recorded in the two-layer disc (i.e., the light power of the light beam emitted from the information recording/reproducing apparatus to the optical disc) must be about 0.8 mW or less for the purpose of preventing deterioration of the optical disc by light during a reproduction operation.

Comparing an information recording/reproducing apparatus which uses a light beam at a wavelength of 405 nm and an objective lens having a NA of 0.85 with a conventional information recording/reproducing apparatus which uses a light beam at a wavelength of 780 nm and an objective lens having a NA of 0.45, such as a conventional MD system, the former recording/reproducing apparatus performs a recording and reproduction operation using less light power than that of the latter, because the energy density of a light spot formed on the optical disc by a light beam having a short wavelength and an objective lens having a large NA is high.

In embodiment 1 of the present invention, the power of a light beam required for recording information at the recording layer of a one-layer disc (recording power for a one-layer disc) is set to 6 mW; the power of a light beam required for reproducing information at the recording layer of a one-layer disc (reproduction power for a one-layer disc) is set to 0.4 mW; the recording power for a two-layer disc is set to 12 mW; and the reproduction power for a two-layer disc is set to 0.8 mW. The recording/reproduction powers for the two-layer disc are set to be about two times the recording/reproduction powers for the one-layer disc, because the upper recording layer (L0 layer) of the two-layer disc, which is closer to the information recording/reproducing apparatus 1000, has a transmittance of about 50%.

In the case of a two-layer disc, in order to achieve a reproduction power of about 0.8 mW for a light beam output from the light condensing section 1003 of the information recording/reproducing apparatus 1000, the GaN-based semiconductor laser must emit a light beam having a light power of about 2.5 to 4 mW (region A of FIG. 2), taking into account variation in efficiency of the semiconductor laser. In this case, the quantum noise generated by the semiconductor laser is smaller than −125 dB/Hz. This value is at a level sufficiently permissible for reproduction of a two-layer disc. In the case of recording information on a two-layer disc, the light power produced by the semiconductor laser is only necessary to be switched from a range of about 2.5 to 4 mW to about 50 mW. As a matter of course, the quantum noise generated when the light power is about 50 mW is smaller than −125 dB/Hz.

In the case of a one-layer disc, as described above, the recording/reproduction powers for the one-layer disc are about a half of those for the two-layer disc. That is, recording/reproduction can be performed on the one-layer disc when the peak value of the light beam emitted from the light condensing section 1003 of the information recording/reproducing apparatus 1000 is 6 mW (=12 mW×50%). In this case, as described above, the reproduction power for the one-layer disc must be about 0.4 mW or smaller as described above for preventing optical deterioration of the optical disc during a reproduction operation. In order to achieve a reproduction power of about 0.4 mW for a light beam output from the light condensing section 1003 of the information recording/reproducing apparatus 1000, the GaN-based semiconductor laser must emits a light beam having a light power of about 1.2 to 2.0 mW (region B of FIG. 2), taking into account variation in efficiency of the semiconductor laser. In this case, the quantum noise generated by the semiconductor laser is greater than −125 dB/Hz, specifically is between −115 dB/Hz to −125 dB/Hz. This value is at a level impermissible for reproduction of a one-layer disc.

Thus, according to the present invention, the light beam having the light power suitable for recording/reproduction of the two-layer disc is also used for recording/reproduction of the one-layer disc. That is, the light source 1 is set so as to emit a light beam having a light power of about 50 mW (predetermined light power) for recording of both one-layer and two-layer discs. The light source 1 is set so as to emit a light beam having a light power of about 2.5 to 4 mW (predetermined light power) for reproduction of both one-layer and two-layer discs. That is, according to the present invention, the dynamic range of the light power of light emitted by the light source 1 for recording or reproduction is not changed, so that the quantum noise can be kept small. In this specification, the light beam emitted by the light source 1 used for recording or reproduction is referred to as "first light beam".

The light source 1 also emits a light beam used for determining the number of recording layer of the optical disc 9 (second light beam). The light power of the second light beam is smaller than that of the first light beam. Note that the light source 1 is not limited to a GaN-based semiconductor laser. The light source 1 may be a semiconductor laser made of any material which can produce a light beam having a light power required for recording/reproduction of a two-layer disc while keeping quantum noise low.

Referring again to FIG. 1, the instruction circuit 18 issues an instruction to the light quantity adjustment section 1001 and the light condensing section 1003 to the settings of the light source 1 and the optical element 3 to any settings. The instruction circuit 18 also controls a spindle motor 28.

The light quantity adjustment section 1001 includes a beam splitter 2, a first photodetector 12, and a light quantity controlling circuit 15. The beam splitter 2 is an optical element which has a transmittance of 90%, and a reflectance of 10%. The light beam reflected by the beam splitter 2 enters the first photodetector 12. The first photodetector 12 converts the light power of the received light beam into an electrical signal, and inputs it to the light quantity controlling circuit 15. This electrical signal is used for monitoring the light power of the light beam emitted by the light source 1. The light quantity controlling circuit 15 controls the light source 1 based on the electrical signal so as to generate a light beam which follows the instruction of the instruction circuit 18.

The light beam transmission adjustment section 1002 includes an optical element 3 having a liquid crystal device and a polarization hologram, a first light condensing lens 10, a second photodetector 13, and an optical element controlling circuit 16. The transmittance of the optical element 3 is changed according to a signal from the optical element controlling circuit 16. According to embodiment 1, in order to obtain the recording/reproduction powers for both a one-layer disc and a two-layer disc without changing the dynamic range of the light power of the light beam emitted by the light source 1, the optical element 3 is set so as to achieve the transmittance shown in TABLE 1:

TABLE 1

|  | recording power (mW) | reproduction power (mW) | transmittance of optical element 3 (%) |
| --- | --- | --- | --- |
| one-layer disc | 6 | 0.4 | 50 |
| two-layer disc | 12 | 0.8 | 100 |

However, the transmittance of the optical element 3 is not limited to the values shown above in TABLE 1. The transmittance of the optical element 3 can be set to any desired value. The second photodetector 13 receives a light beam condensed by the first light condensing lens 10 and converts the light beam into an electrical signal, which is input to the optical element controlling circuit 16. This electrical signal is a signal for monitoring only the light power (or transmittance) of the light beam transmitted through the optical element 3, since the light power of the light beam emitted by the light source 1 is accurately controlled by the light quantity adjustment section 1001. The optical element controlling circuit 16 controls the optical element 3 based on the electrical signal such that the light power is attenuated according to an instruction issued by the instruction circuit 18 (i.e., such that the optical element 3 has an optimum transmittance). In this way, the light beam transmission adjustment section 1002 adjusts the quantity of the light beam which is emitted by the light source 1 and transmitted through the optical element 3.

The light condensing section 1003 includes a diffraction grating 4, a polarized beam splitter 5, a collimator lens 6, a quarter-wave plate 17, a mirror 7, and an objective lens 8. The diffraction grating 4 is a grating formed by patterning a glass surface using a photolithography technique and etching according to the pattern. The 0th-order diffraction efficiency of the diffraction grating 4 is about 90%. The ±1st order diffraction efficiency of the diffraction grating 4 is about 10%. The polarized beam splitter 5 transmits 90% and reflects 10% of the light beam emitted by the light source 1 which is linearly polarized light. The polarized beam splitter 5 reflects the 100% (i.e., all) of the light beam polarized in a direction perpendicular to the polarization direction of the linearly polarized light emitted by the light source 1. The collimator lens 6 converts a divergent light beam emitted by the light source 1 to a parallel light beam. The quarter-wave plate 17 converts the polarization of the light beam so as to output circularly polarized light. The mirror 7 reflects the light beam output from the quarter-wave plate 17 and directs the light beam to the optical disc 9. The objective lens 8 condenses the light beam onto the optical disc 9 so as to form a light spot on a recording layer of the optical disc 9.

In this embodiment, a single lens is used as the object lens 8. However, according to the present invention, a combined lens element having a high NA may be used. In such a case, the diameter of the light beam is reduced due to the high NA, whereby recording at a high density can be achieved. In the case where such a combined lens element having a high NA is used as the objective lens 8 of the present invention, the quantum noise of the light source is suppressed to a low level, and a stable reproduction signal can be obtained. Such a structure is advantageous in comparison to a conventional information recording/reproducing apparatus.

The determination section 20 includes a second light condensing lens 11, a third photodetector 14, a comparator circuit 19, and a reference voltage generating circuit 101. The third photodetector 14 receives a light beam condensed by the second light condensing lens 11 and converts the light beam to an electrical signal, which is input to the comparator circuit 19. The comparator circuit 19 compares the received electrical signal with a reference voltage signal generated by the reference voltage generating circuit 101. Based on the comparison, the comparator circuit 19 determines whether the optical disc 9 has one recording layer or two recording layers.

In the information recording/reproducing apparatus 1000 of the present invention, the head optical transmittance of the optical system of the light condensing section 1003 (i.e., the transmittance of the entire optical system of an optical head (not including the light beam transmission adjustment section 1002)) is about 25%.

2. Determination Operation of Determination Section 20:

Next, a determination operation of the determination section 20 is described.

According to an instruction issued by the instruction circuit 18, the light source 1 emits a light beam having a light power of 1.2 mW (second light beam). This light power is smaller than that of the light power of the first light beam. In this example, according to the instruction issued by the instruction circuit 18, the optical element 3 is set so as to have a transmittance of 100%. In the case where such a setting is employed, the light beam which has been emitted by the light source 1 and transmitted through the beam splitter 2 and the optical element 3 has a light power of about 0.3 mW (=1.2 mW×25%) when it exits from the light condensing section 1003. Since the reproduction power suitable for a one-layer disc is 0.4 mW or smaller, even when the optical disc 9 having an unidentified number of recording layers is irradiated with a light beam having a power of 0.3 mW, there is no probability that the optical disc 9 is deteriorated or data is erroneously deleted from the optical disc 9.

The second light beam is transmitted through the beam splitter 2, the optical element 3, and the light condensing section 1003, and projected onto the optical disc 9 so as to follow an information track of the optical disc 9 using known optical disc apparatus technology. The second light beam reflected by the optical disc 9 is transmitted again through the objective lens 8, and reflected by the polarized beam splitter 5 so as to enter the third photodetector 14. The third photodetector 14 converts the light power of the received second light beam (corresponding to the quantity of reflected light) into a signal voltage $V_P$. The signal voltage $V_P$ is input to the comparator circuit 19. The comparator circuit 19 compares the signal voltage $V_P$ with a reference voltage $V_{Pth}$ generated by the reference voltage generating circuit 101.

When the signal voltage $V_P$ and the reference voltage $V_{Pth}$ satisfy the relationship $V_P > V_{Pth}$, the comparator circuit 19 outputs to the instruction circuit 18 a High signal which indicates that the optical disc 9 is a one-layer disc. When the signal voltage $V_P$ and the reference voltage $V_{Pth}$ satisfy the relationship $V_P < V_{Pth}$, the comparator circuit 19 outputs to the instruction circuit 18 a Low signal which indicates that the optical disc 9 is a two-layer disc.

The reference voltage $V_{Pth}$ is set to an intermediate voltage value between a signal voltage which indicates the light quantity of the second light beam reflected by a one-layer disc and a signal voltage which indicates the light quantity of the second light beam reflected by a two-layer disc.

In this way, the determination section 20 determines whether the optical disc 9 is a one-layer disc or a two-layer disc. The instruction circuit 18 outputs an instruction to record information on the optical disc 9 or an instruction to reproduce information from the optical disc 9 according to the determination result of the determination section 20.

Another example of determination of the number of recording layers of the optical disc 9 is now described. The objective lens 8 is reciprocatingly moved along the optical axis direction. With the reciprocating movement of the objective lens 8 along the optical axis direction, in the case of a one-layer disc, two types of light beams are obtained. For example, in the case of a one-layer disc, a light beam of the first type is reflected by a recording layer (L0 layer), and a light beam of the second type is reflected by an interface between the recording layer and a disc base layer. In the case of a two-layer disc, three types of light beams are obtained. For example, a light beam of the first type is reflected by the surface of the first recording layer (L0 layer), a light beam of the second type is reflected by an interface between the first and second recording layers, and a light beam of the third type is reflected by an interface between the second recording layer and the disc base layer.

These light beams have different levels of light power, and therefore, a signal voltage obtained by the third photodetector 14 has the number of times of variation m (hereinafter, simply referred to as "variation number m") according to the type of the light beam. The variation number m is input to the comparator circuit 19. The comparator circuit 19 compares the variation number m of the input signal voltage with reference variation numbers including a first variation number $m_1$ and a second variation number $m_2$. The first variation number $m_1$ and the second variation number $m_2$ satisfy the relationship of $m_1 < m_2$. The first variation number $m_1$ indicates the variation number of the signal voltage for a one-layer disc. The second variation number $m_2$ indicates the variation number of the signal voltage for a two-layer disc.

When the variation number m is equal to the first variation number $m_1$ ($m=m_1$), the comparator circuit 19 outputs to the instruction circuit 18 a High signal which indicates that the optical disc 9 is a one-layer disc. When the variation number m is equal to the second variation number $m_2$ ($m=m_2$), the comparator circuit 19 outputs to the instruction circuit 18 a Low signal which indicates that the optical disc 9 is a two-layer disc.

Still another example of determination of the number of recording layers of the optical disc 9 is now described. Before a final product of the optical disc 9 reaches a user, specifically, at the time of production of the optical disc 9, information which indicates the number of recording layers included in the optical disc 9 may be recorded in a portion of the recording region of the optical disc 9. The information which indicates the number of recording layers is preferably information about the reflectance of the optical disc 9. For example, the information about the reflectance is a voltage value corresponding to the light quantity of the second light beam reflected by a one-layer disc, or a voltage value corresponding to the light quantity of the second light beam reflected by a two-layer disc. In the case where the optical disc 9 originally has such information, the comparator circuit 19 only needs to determine whether or not the received signal voltage is equal to the voltage value indicating the one-layer disc, or whether or not the received signal voltage is equal to the voltage value indicating the two-layer disc.

3. Recording Operation of Information Recording/Reproducing Apparatus 1000:

Next, a recording operation of the information recording/reproducing apparatus 1000 performed when the determination section 20 determines that the optical disc 9 is a one-layer disc is described while referring again to FIG. 1.

The instruction circuit 18 issues to the light quantity adjustment section 1001 an instruction to actuate the light source 1 to produce a first light beam having predetermined light power $P_{pre}$ required for recording information on a two-layer disc (e.g., 50 mW). On the other hand, the instruction circuit 18 issues to the optical element controlling circuit 16 of the light beam transmission adjustment section 1002 an instruction to actuate the optical element 3 to adjust the predetermined light power $P_{pre}$ of the first light beam so as to be a first light power $P_1$ (e.g., about a 50%-attenuated light power).

Based on the instruction from the instruction circuit 18, the light source 1 emits a first light beam having predetermined light power $P_{pre}$ which is modulated according to information to be recorded. The first light beam is linearly polarized light. The first light beam is transmitted through the beam splitter 2 and enters the optical element 3. The optical element 3 adjusts the light power $P_{pre}$ of the first light beam to the first light power $P_1$ based on an instruction from the instruction circuit 18. The first light beam having the first light power $P_1$ which is about 50% of the predetermined light power $P_{pre}$ enters the light condensing section 1003. A portion of the first light beam is diffracted by the diffraction grating 4, and the remaining portion is transmitted through the diffraction grating 4. The first light beam (including diffracted light and transmitted light) then enters the polarized beam splitter 5. The first light beam transmitted through the polarized beam splitter 5 is converted by the collimator lens 6 to parallel light. The first light beam is converted by the quarter-wave plate 17 to circularly polarized light. Then, the first light beam is reflected by the mirror 7 by 90° and directed to the optical disc 9. The first light beam is condensed by the objective lens 8 so as to form a light spot on the optical disc 9. The state of a portion of the recording layer on which the light spot is formed is changed (for example, the crystalline state of the light spot portion is changed) according to the information to be recorded, whereby information is recorded on the optical disc 9 as a change in the state of the recording layer.

The resultant recording power of light incident on the optical disc 9 is 6 mW (=50 mW×25% (head optical transmittance)×50% (transmittance of the optical element 3)). As described above, this recording power is permissible for a one-layer disc.

Next, a recording operation of the information recording/reproducing apparatus 1000 performed when the determination section 20 determines that the optical disc 9 is a two-layer disc is described.

The instruction circuit 18 issues to the light quantity adjustment section 1001 an instruction to actuate the light source 1 to produce a first light beam having predetermined light power $P_{pre}$ required for recording information on a two-layer disc (e.g., 50 mW). On the other hand, the instruction circuit 18 issues to the optical element controlling circuit 16 of the light beam transmission adjustment section 1002 an instruction to actuate the optical element 3 to adjust the light power $P_{pre}$ of the first light beam so as to be a second light power $P_2$ (e.g., about a 0%-attenuated (i.e., non-attenuated) light power).

The operation performed thereafter is substantially the same as that performed for recording information in a one-layer disc, except that the first light beam having the light power $P_{pre}$ is adjusted so as to have the second light power $P_2$ by the optical element 3 of the light beam transmission adjustment section 1002, and therefore detailed descriptions thereof are omitted. In this case, the optical element 3 is set so as to have a transmittance of about 100%, and thus, the second light power $P_2$ is substantially equal to the predetermined light power $P_{pre}$.

In this case, the resultant recording power of light incident on the optical disc 9 is 12.5 mW (=50 mW×25% (head optical transmittance)×100% (transmittance of the optical element 3)). As described above, this recording power is permissible for a two-layer disc.

4. Reproduction Operation of Information Recording/Reproducing Apparatus 1000:

Next, a reproduction operation of the information recording/reproducing apparatus 1000 performed when the determination section 20 determines that the optical disc 9 is a one-layer disc is described while referring again to FIG. 1.

The instruction circuit 18 issues to the light quantity adjustment section 1001 an instruction to actuate the light source 1 to produce a first light beam having predetermined light power $P_{pre}$ required for reproducing information from a two-layer disc (e.g., about 2.5 to 4 mW). On the other hand, the instruction circuit 18 issues to the optical element controlling circuit 16 of the light beam transmission adjustment section 1002 an instruction to actuate the optical element 3 to adjust the predetermined light power $P_{pre}$ of the first light beam so as to be a first light power $P_1$ (e.g., about a 50%-attenuated light power).

Based on the instruction from the instruction circuit 18, the light source 1 emits an unmodulated first light beam having the predetermined light power $P_{pre}$. The first light beam is linearly polarized light. The first light beam is transmitted through the beam splitter 2 and enters the optical element 3.

The optical element 3 adjusts the light power $P_{pre}$ of the first light beam to the first light power $P_1$ based on an instruction from the instruction circuit 18. The first light beam having the first light power $P_1$ which is about 50% of the predetermined light power $P_{pre}$ enters the light condensing section 1003. A portion of the first light beam is diffracted by the diffraction grating 4, and the remaining portion is transmitted through the diffraction grating 4. The first light beam (including diffracted light and transmitted light) then enters the polarized beam splitter 5. The first light beam transmitted through the polarized beam splitter 5 is converted by the collimator lens 6 to parallel light. The first light beam is converted by the quarter-wave plate 17 to circularly polarized light. Then, the first light beam is reflected by the mirror 7 by 90° and directed to the optical disc 9. The first light beam is condensed by the objective lens 8 so as to form a light spot on the optical disc 9.

The first light beam is reflected by the recording layer of the optical disc 9 at a reflectance according to the state of the recording layer. The first light beam reflected by the recording layer of the optical disc 9 again enters the light condensing section 1003. The first light beam is transmitted through the objective lens 8 and reflected by the mirror 7 toward the quarter-wave plate 17. The reflected first light beam is converted by the quarter-wave plate 17 to linearly polarized light whose polarization direction is perpendicular to that of the linearly polarized light output from the collimator lens 6 to the quarter-wave plate 17. Then, the first light beam is transmitted through the collimator lens 6 and reflected by the polarized beam splitter 5. The reflected first light beam then passes through the second light condensing lens 11 and enters the third photodetector 14. The third photodetector 14 extracts: an information signal which indicates information recorded on the optical disc 9; a focusing error signal which indicates a focusing state of the first light beam on the optical disc 9; and a tracking error signal which indicates the irradiation position of the first light beam.

In the case of a non-recordable information medium, the tracking error signal is generated by a phase contrast method. In the case of a recordable information medium, the tracking error signal is generated by a three-beam method which uses light diffracted by the diffraction grating 4.

A focus control section (not shown) controls the position of the objective lens 8 along the optical axis direction based on the focus error signal, thereby condensing the first light beam onto the optical disc 9 in a focused state. A tracking control section (not shown) controls the position of the objective lens 8 in a direction perpendicular to the optical axis direction based on the tracking error signal, thereby condensing the first light beam onto a desired track of the optical disc 9.

The resultant reproduction power of light incident on the optical disc 9 is 0.4 mW (=about 2.5 to 4 mW×25% (head optical transmittance)×50% (transmittance of the optical element 3)). As described above, this reproduction power is permissible for a one-layer disc.

Next, a reproduction operation of the information recording/reproducing apparatus 1000 performed when the determination section 20 determines that the optical disc 9 is a two-layer disc is described.

The instruction circuit 18 issues to the light quantity adjustment section 1001 an instruction to actuate the light source 1 to produce a first light beam having a predetermined light power $P_{pre}$ required for reproducing information from a two-layer disc (e.g., about 2.5 to 4 mW). On the other hand, the instruction circuit 18 issues to the optical element controlling circuit 16 of the light beam transmission adjustment section 1002 an instruction to actuate the optical element 3 to adjust the predetermined light power $P_{pre}$ of the first light beam so as to be a second light power $P_2$ (e.g., about a 0%-attenuated (i.e., non-attenuated) light power).

The operation performed thereafter is substantially the same as that performed for reproducing information from a one-layer disc, except that the first light beam having the light power $P_{pre}$ is adjusted so as to have the second light power $P_2$ by the optical element 3 of the light beam transmission adjustment section 1002, and therefore detailed descriptions thereof are omitted. In this case, the optical element 3 is set so as to have a transmittance of about 100%, and thus, the second light power $P_2$ is substantially equal to the predetermined light power $P_{pre}$.

In this case, the resultant reproduction power of light incident on the optical disc 9 is 0.8 mW (=about 2.5 to 4 mW×25% (head optical transmittance)×100% (transmittance of the optical element 3)). As described above, this reproduction power is permissible for a two-layer disc.

In this specification, the phrase "substantially equal" means that the predetermined light power $P_{pre}$ and the second light power $P_2$ do not have exactly the same value, but the difference between power $P_{pre}$ and power $P_2$ does not cause a problem in the information recording and reproduction operations on the optical disc 9.

As described hereinabove, according to embodiment 1 of the present invention, when information is recorded in or reproduced from a one-layer disc, a predetermined light power $P_{pre}$ of a first light beam emitted by the light source 1, which is suitable for recording or reproduction of information on a two-layer disc, is reduced by about 12.5% (=25% (head optical transmittance)×50% (transmittance of the optical element 3)). With such a reduced light power, recording or reproduction of information on a one-layer disc is realized. In an information recording/reproducing apparatus 1000, even when the reproduction power suitable for a one-layer disc inserted in the apparatus 1000 is 0.4 mW, the light source 1 emits a light beam which provides a reproduction power suitable for a two-layer disc (0.8 mW), i.e., the light source 1 emits a light beam having a light power of about 2.5 to 4 mW. Thus, the quantum noise can be maintained to be smaller than −125 dB/Hz. In a recording operation with a one-layer disc and a two-layer disc, for example, the light power of a light beam emitted by the light source 1 is simply modulated into a light beam having a light power of about 50 mW. That is, according to embodiment 1 of the present invention, a wide dynamic range of the light power for recording or reproduction can be obtained according to the number of recording layers of an optical disc used, i.e., a one-layer disc or a two-layer disc, without changing the dynamic range of the light power of a light beam emitted by the light source 1 for recording or reproduction.

According to embodiment 1 of the present invention, only when it is determined that the optical disc 9 is a one-layer disc, the transmittance of the optical element 3 of the light beam transmission adjustment section 1002 is reduced by about 50%. With such an arrangement, the quantum noise of the light power of a light beam emitted by the light source 1 can be kept low during a reproduction operation. Further, during the reproduction operation, the light power of the light beam at the surface of the recording layer of the optical disc 9 can be maintained to a low level such that deterioration of the optical disc 9 and erroneous deletion of information from the optical disc 9 are prevented.

After the number of recording layers of the optical disc 9 is determined, a certain amount of time is consumed until switching of the transmittance of the optical element 3 is completed. However, switching of the operation mode from a reproduction operation to a recording operation can be quickly achieved after a reproduction of an intended address of the optical disc 9, because switching of the transmittance of the optical element 3 is not performed in the switching of the operation mode, and the optical element 3 does not need to be mechanically inserted in or removed from the optical path in the information recording/reproducing apparatus 1000. Further, the transmittance of the optical element 3 is switched based on an electrical signal, and therefore, the size of the information recording/reproducing apparatus 1000 of the present invention can be small in comparison to the conventional recording/reproducing apparatus including the optical head 600 which is mechanically inserted in or removed from the optical path.

According to embodiment 1 of the present invention, the recording/reproduction power for a one-layer disc is set so as to be ½ of the recording/reproduction power for a two-layer disc. The predetermined light power $P_{pre}$, the first light power $P_1$, and the second light power $P_2$ satisfy the relationship of $P_1 \times 2 = P_2 = P_{pre}$. However, the present invention is not limited to such setting and relationship. According to the present invention, the recording/reproduction power for a one-layer disc and the recording/reproduction power for a two-layer disc may have a relationship different from the above relationship according to the level of the predetermined light power $P_{pre}$ of light emitted by the light source 1. Even in such a case, the predetermined light power $P_{pre}$, the first light power $P_1$, and the second light power $P_2$ satisfy the relationship of $P_1 < P_2 \leq P_{pre}$.

(Embodiment 2)

Figure 3:
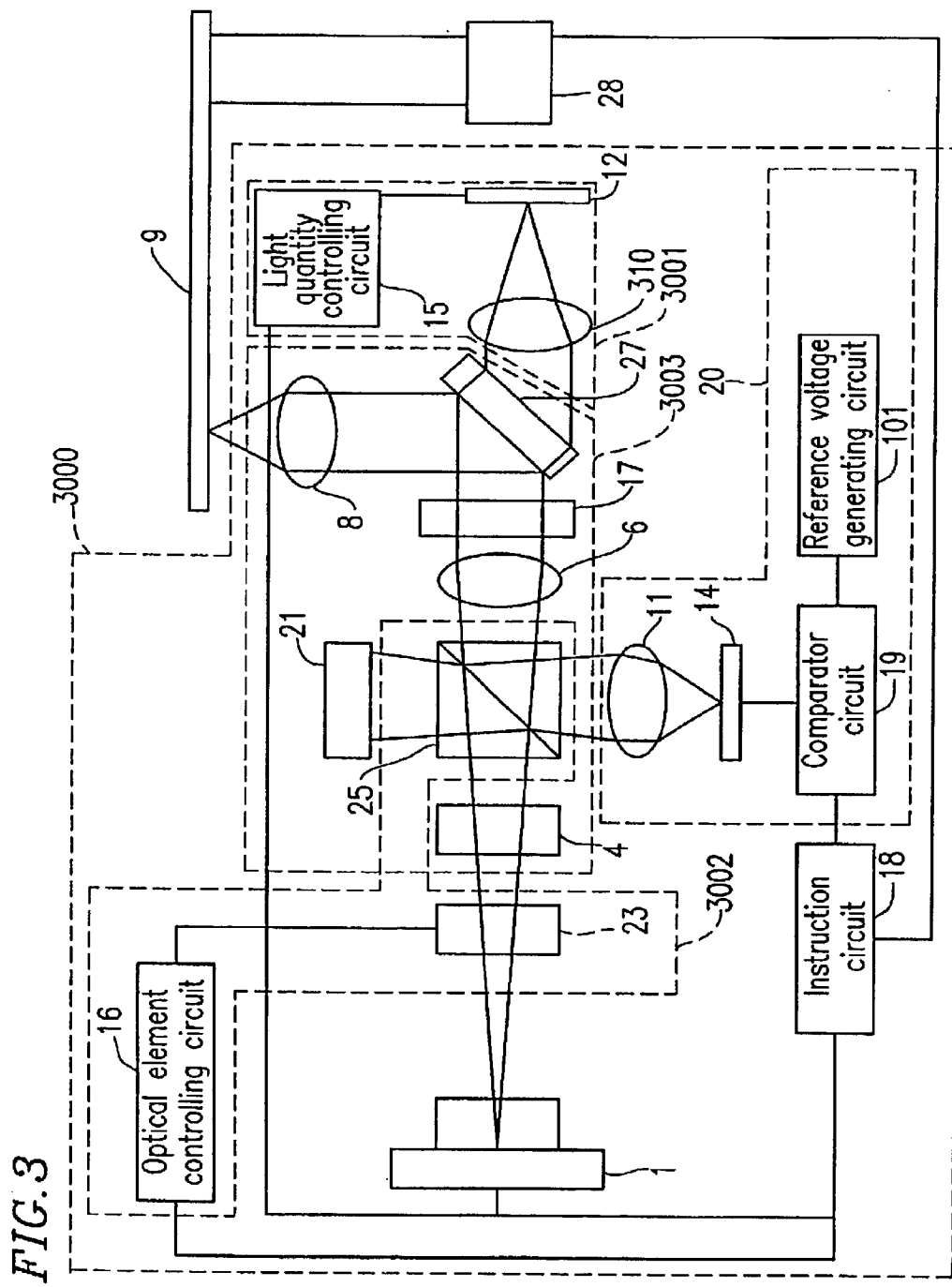
FIG. 3 shows a structure of an information recording/reproducing apparatus 3000 according to embodiment 2 of the present invention.

FIG. 3 shows a structure of an information recording/reproducing apparatus 3000 according to embodiment 2 of the present invention.

1. Structure of Information Recording/Reproducing Apparatus 3000:

The information recording/reproducing apparatus 3000 includes a light source 1, an instruction circuit 18, a determination section 20, a light quantity adjustment section 3001, a light beam transmission adjustment section 3002, and a light condensing section 3003. In FIG. 3, like elements are indicated by like reference numerals used in FIG. 1, and detailed descriptions thereof are omitted.

The information recording/reproducing apparatus 3000 according to embodiment 2 shown in FIG. 3 is different from the information recording/reproducing apparatus 1000 according to embodiment 1 shown in FIG. 1 in respect of the structures of the light quantity adjustment section 3001, the light beam transmission adjustment section 3002, and the light condensing section 3003.

The light quantity adjustment section 3001 includes a first light condensing lens 310, a first photodetector 12, and a light quantity controlling circuit 15. The first photodetector 12 receives a light beam condensed through the first light condensing lens 310 and converts the received light beam into an electrical signal, which is input to the light quantity controlling circuit 15. The operation of the light quantity adjustment section 3001 is the same as that of the light quantity adjustment section 1001 shown in FIG. 1, and therefore, the detailed descriptions thereof are omitted.

The light beam transmission adjustment section 3002 includes an optical element 23 having a liquid crystal device, a polarized beam splitter 25, and an optical element controlling circuit 16. The polarization direction of the optical element 23 is changed according to a signal from the optical element controlling circuit 16. The polarized beam splitter 25 transmits 100% of a linearly polarized light beam emitted by the light source 1, and reflects 100% of a linearly polarized light beam which has a polarization direction perpendicular to that of the linearly polarized light beam emitted by the light source 1. According to embodiment 2, the optical element 23 is set so as to change the polarization direction of a light beam such that 50% of the light beam is transmitted therethrough, or is set so as not to change the polarization direction of a light beam such that 100% of the light beam is transmitted therethrough. However, the optical element 23 and the polarized beam splitter 25 can change the polarization direction of a light beam by any amount such that any quantity of light can be transmitted therethrough.

The light condensing section 3003 includes a diffraction grating 4, the polarized beam splitter 25, a light absorbing element 21, a collimator lens 6, a quarter-wave plate 17, a mirror 27, and an objective lens 8. The light absorbing element 21 absorbs light so as to prevent occurrence of stray light. When a circularly polarized light beam enters the mirror 27, the mirror 27 transmits 10% of the light beam and reflects 90% of the light beam. The mirror 27 directs the reflected light beam toward the optical disc 9.

In the information recording/reproducing apparatus 3000 of the present invention, the head optical transmittance of the optical system of the light condensing section 3003 is about 25%.

The determination section 20 determines whether the optical disc 9 has one recording layer or two recording layers in the same manner as that described in embodiment 1.

2. Recording Operation of Information Recording/Reproducing Apparatus 1000:

Next, a recording operation of the information recording/reproducing apparatus 3000 performed when the determination section 20 determines that the optical disc 9 is a one-layer disc is described.

The instruction circuit 18 issues to the light quantity adjustment section 3001 an instruction to actuate the light source 1 to produce a first light beam having a predetermined light power $P_{pre}$ required for recording information on a two-layer disc (e.g., 50 mW). On the other hand, the instruction circuit 18 issues to the optical element controlling circuit 16 of the light beam transmission adjustment section 3002 an instruction to actuate the optical element 23 to change the polarization direction of the first light beam.

Based on the instruction from the instruction circuit 18, the light source 1 emits a first light beam having a predetermined light power $P_{pre}$ which is modulated according to information to be recorded. The first light beam is linearly polarized light. The first light beam emitted from the light source 1 enters the optical element 23. The optical element 23 changes the polarization direction of the first light beam based on the instruction from the instruction circuit 18. The first light beam enters the light condensing section 3003. A portion of the first light beam is diffracted by the diffraction grating 4, and the remaining portion is transmitted through the diffraction grating 4. The first light beam (including diffracted light and transmitted light) then enters the polarized beam splitter 25. About 50% of the first light beam is transmitted through the polarized beam splitter 25, and the remaining 50% of the first light beam is reflected by the polarized beam splitter 25. As a result, the predetermined light power $P_{pre}$ of the first light beam emitted by the light source 1 is adjusted so as to be about 50%-attenuated first light power $P_1$. The first light beam transmitted through the polarized beam splitter 25 is converted by the collimator lens 6 to parallel light. The light absorbing element 21 receives the light beam reflected by the polarized beam splitter 25 so as to prevent occurrence of stray light. The first light beam is converted by the quarter-wave plate 17 to circularly polarized light. Then, 90% of the first light beam output from the quarter-wave plate 17 is reflected by the mirror 27 by 90° and directed to the optical disc 9. The remaining 10% of the first light beam is transmitted through the mirror 27 so as to enter the first photodetector 12 of the light quantity adjustment section 3001. The light quantity adjustment section 3001 operates as described above. The first light beam reflected by the mirror 27 is condensed by the objective lens 8 so as to form a light spot on the optical disc 9. The state of a portion of the recording layer on which the light spot is formed is changed (for example, the crystalline state of the light spot portion is changed) according to the information to be recorded, whereby information is recorded on the optical disc 9 as a change in the state of the recording layer.

As in embodiment 1, the resultant recording power of light incident on the optical disc 9 is 6 mW (=50 mW×25% (head optical transmittance)×50% (transmittance of the optical element 23)). As described above, this recording power is permissible for a one-layer disc.

Next, a recording operation of the information recording/reproducing apparatus 3000 performed when the determination section 20 determines that the optical disc 9 is a two-layer disc is described.

The instruction circuit 18 issues to the light quantity adjustment section 3001 an instruction to actuate the light source 1 to produce a first light beam having predetermined light power $P_{pre}$ required for recording information on a two-layer disc (e.g., 50 mW). On the other hand, the instruction circuit 18 issues to the optical element controlling circuit 16 of the light beam transmission adjustment section 3002 an instruction that the optical element 23 does not change the polarization direction of the first light beam.

The operation performed thereafter is substantially the same as that performed for recording information in a one-layer disc, except that the polarization direction of the first light beam is not changed by the optical element 23 of the light beam transmission adjustment section 3002 so that the predetermined light power $P_{pre}$ of the first light beam is maintained. Therefore, detailed descriptions of the subsequent operation are omitted.

As in embodiment 1, the resultant recording power of light incident on the optical disc 9 is 12.5 mW (=50 mW×25% (head optical transmittance)×100% (transmittance of the optical element 23)). As described above, this recording power is permissible for a two-layer disc.

3. Reproduction Operation of Information Recording/Reproducing Apparatus 3000:

Next, a reproduction operation of the information recording/reproducing apparatus 3000 performed when the determination section 20 determines that the optical disc 9 is a one-layer disc is described.

The instruction circuit 18 issues to the light quantity adjustment section 3001 an instruction to actuate the light source 1 to produce a first light beam having a predetermined light power $P_{pre}$ required for reproducing information from a two-layer disc (e.g., about 2.5 to 4 mW). On the other hand, the instruction circuit 18 issues to the optical element controlling circuit 16 of the light beam transmission adjustment section 3002 an instruction to actuate the optical element 23 to change the polarization direction of the first light beam.

Based on the instruction from the instruction circuit 18, the light source 1 emits an unmodulated first light beam having the predetermined light power $P_{pre}$. The first light beam is linearly polarized light. The first light beam enters the optical element 23. The optical element 23 changes the polarization direction of the first light beam based on the instruction from the instruction circuit 18. Specifically, about 50% of the first light beam is transmitted through the optical element 23, and the remaining 50% of the first light beam is reflected by the optical element 23. As a result, the predetermined light power $P_{pre}$ of the first light beam emitted by the light source 1 is adjusted so as to be about 50%-attenuated first light power $P_1$. Thereafter, the first light beam passes through the same route as that described above in connection with the recording operation, so as to form a light spot on the optical disc 9.

The first light beam is reflected by the recording layer of the optical disc 9 at a reflectance according to the state of the recording layer. The first light beam reflected by the recording layer of the optical disc 9 again enters the light condensing section 3003. The first light beam is transmitted through the objective lens 8 and reflected by the mirror 27 toward the quarter-wave plate 17. The reflected first light beam is converted by the quarter-wave plate 17 to linearly polarized light whose polarization direction is perpendicular to that of the linearly polarized light output from the collimator lens 6 to the quarter-wave plate 17. Then, the first light beam is transmitted through the collimator lens 6 and reflected by the polarized beam splitter 25. The reflected first light beam then passes through the second light condensing lens 11 and enters the second photodetector 14. The second photodetector 14 extracts: an information signal which indicates information recorded on the optical disc 9; a focusing error signal which indicates a focusing state of the first light beam on the optical disc 9; and a tracking error signal which indicates the irradiation position of the first light beam.

The tracking error signal is generated using the same method as that described in embodiment 1. A focus control section (not shown) and a tracking control section (not shown) control the position of the objective lens 8 based on the focus error signal and the tracking error signal.

As in embodiment 1, the resultant reproduction power of light incident on the optical disc 9 is 0.4 mW (=about 2.5 to 4 mW×25% (head optical transmittance)×50% (transmittance of the optical element 23)). As described above, this reproduction power is permissible for a one-layer disc.

Next, a reproduction operation of the information recording/reproducing apparatus 3000 performed when the determination section 20 determines that the optical disc 9 is a two-layer disc is described.

The instruction circuit 18 issues to the light quantity adjustment section 3001 an instruction to actuate the light source 1 to produce a first light beam having a predetermined light power $P_{pre}$ required for reproducing information from a two-layer disc (e.g., about 2.5 to 4 mW). On the other hand, the instruction circuit 18 issues to the optical element controlling circuit 16 of the light beam transmission adjustment section 3002 an instruction that the optical element 23 does not change the polarization direction of the first light beam.

The operation performed thereafter is substantially the same as that performed for reproducing information from a one-layer disc, except that the polarization direction of the first light beam is not changed by the optical element 23 of the light beam transmission adjustment section 3002 so that the predetermined light power $P_{pre}$ of the first light beam is maintained. Therefore, detailed descriptions of the subsequent operation are omitted.

As in embodiment 1, the resultant reproduction power of light incident on the optical disc 9 is 0.8 mW (=about 2.5 to 4 mW×25% (head optical transmittance)×100% (transmittance of the optical element 23)). As described above, this reproduction power is permissible for a two-layer disc.

(Embodiment 3)

Figure 4:
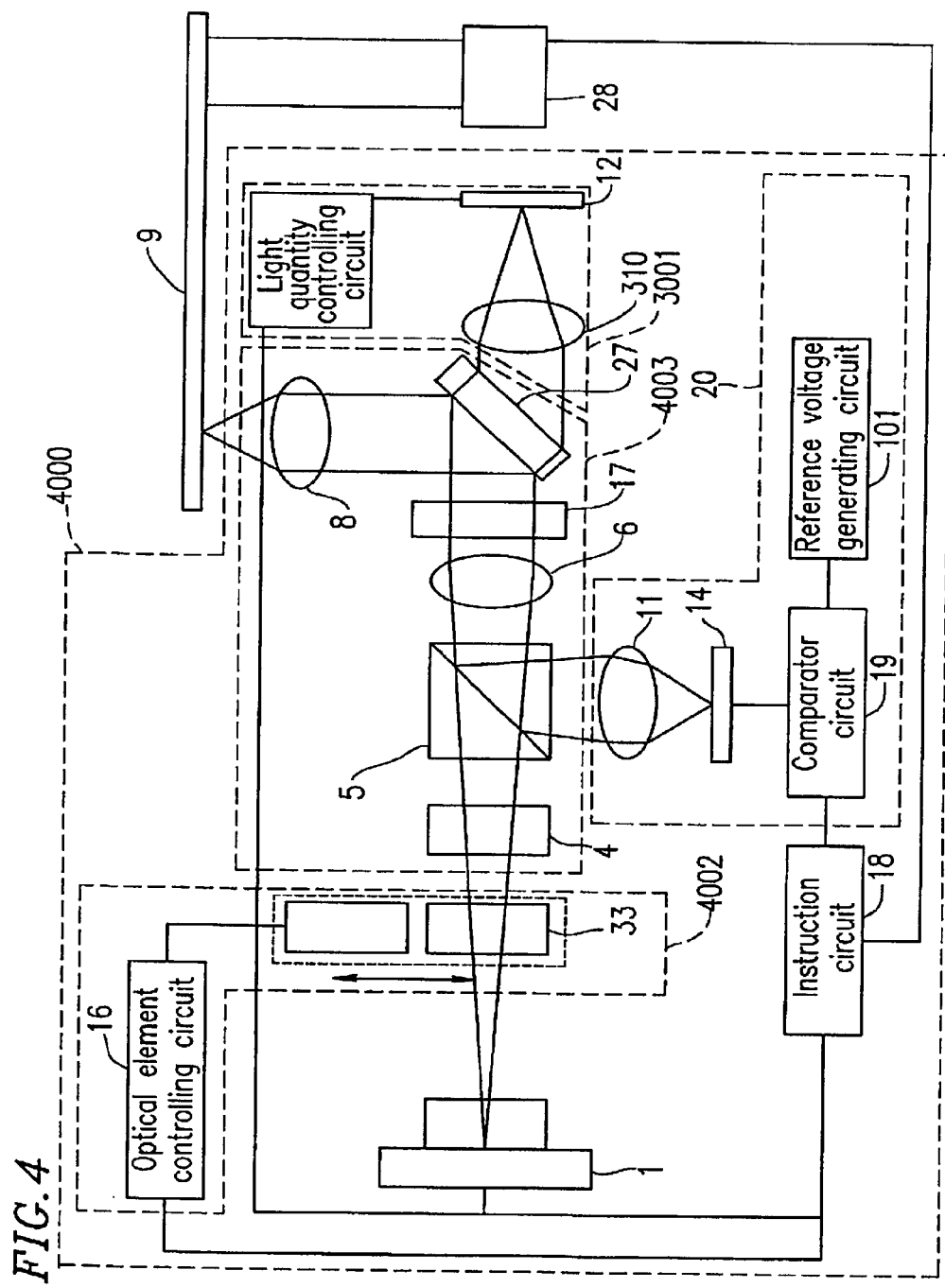
FIG. 4 shows a structure of an information recording/reproducing apparatus 4000 according to embodiment 3 of the present invention.

FIG. 4 shows a structure of an information recording/reproducing apparatus 4000 according to embodiment 3 of the present invention.

1. Structure of Information Recording/Reproducing Apparatus 4000:

The information recording/reproducing apparatus 4000 includes a light source 1, an instruction circuit 18, a determination section 20, a light quantity adjustment section 3001, a light beam transmission adjustment section 4002, and a light condensing section 4003. In FIG. 4, like elements are indicated by like reference numerals used in FIGS. 1 and 3, and detailed descriptions thereof are omitted.

The information recording/reproducing apparatus 4000 according to embodiment 3 shown in FIG. 4 is different from the information recording/reproducing apparatus 3000 according to embodiment 2 shown in FIG. 3 in respect of the structures of the light beam transmission adjustment section 4002 and the light condensing section 4003.

The light beam transmission adjustment section 4002 includes an optical element 33 having an optical filter, and an optical element controlling circuit 16.

The optical filter of embodiment 3 transmits 50% of a light beam emitted by the light source 1. The optical filter is formed by, for example, depositing a thin metal film, such as a chrome film, on a glass plate. The transmittance of the optical filter can be appropriately set by changing the thickness of the thin metal film. Further, a plurality of regions having different transmittances can be formed over the surface of a single optical filter using a mask. For example, one optical filter may have a portion which transmits 50% of a received light beam and a portion which transmits 25% of a received light beam.

Based on the instruction from the instruction circuit 18, the optical element controlling circuit 16 controls the optical element 33 so as to be mechanically inserted in or removed from the optical path between the light source 1 and the diffraction grating 4.

The light condensing section 4003 has substantially the same structure as that of the light condensing section 3003 shown in FIG. 3 except that the light condensing section 4003 does not include the light absorbing element 21 shown in FIG. 3 and that the light condensing section 4003 employs the polarized beam splitter 5 shown in FIG. 1 instead of the polarized beam splitter 25 shown in FIG. 3. In the light condensing section 4003, it is not necessary to provide the light absorbing element 21 because the polarization direction of a light beam is not changed by the optical element 33 in embodiment 3, and accordingly, there is no concern that stray light occurs in the polarized beam splitter 5.

In the information recording/reproducing apparatus 4000 of the present invention, the head optical transmittance of the optical system of the light condensing section 4003 is about 25%.

The determination section 20 determines whether the optical disc 9 has one recording layer or two recording layers in the same manner as that described in embodiment 1.

2. Recording Operation of Information Recording/Reproducing Apparatus 4000:

Next, a recording operation of the information recording/reproducing apparatus 4000 performed when the determination section 20 determines that the optical disc 9 is a one-layer disc is described.

The instruction circuit 18 issues to the light quantity adjustment section 3001 an instruction to actuate the light source 1 to produce a first light beam having a predetermined light power $P_{pre}$ required for recording information on a two-layer disc (e.g., 50 mW). On the other hand, the instruction circuit 18 issues to the optical element controlling circuit 16 of the light beam transmission adjustment section 4002 an instruction to insert the optical element 33 in the optical path between the light source 1 and the diffraction grating 4.

Based on the instruction from the instruction circuit 18, the light source 1 emits a first light beam having the predetermined light power $P_{pre}$ which is modulated according to information to be recorded. The first light beam is linearly polarized light. The first light beam emitted from the light source 1 enters the optical element 33. The predetermined light power $P_{pre}$ of the first light beam is adjusted by the optical element 33 so as to be about a 50%-attenuated first light power $P_1$. The first light beam having the first light power $P_1$ enters the light condensing section 4003. Thereafter, the first light beam passes through the same route as that described above in connection with the recording operation of embodiment 2, so as to form a light spot on the optical disc 9, thereby recording information on the optical disc 9.

As in embodiments 1 and 2, the resultant recording power of light incident on the optical disc 9 is 6 mW (=50 mW×25% (head optical transmittance)×50% (transmittance of the optical element 33)). As described above, this recording power is permissible for a one-layer disc.

Next, a recording operation of the information recording/reproducing apparatus 4000 performed when the determination section 20 determines that the optical disc 9 is a two-layer disc is described.

The instruction circuit 18 issues to the light quantity adjustment section 3001 an instruction to actuate the light source 1 to produce a first light beam having predetermined light power $P_{pre}$ required for recording information on a two-layer disc (e.g., 50 mW). On the other hand, the instruction circuit 18 issues to the optical element controlling circuit 16 of the light beam transmission adjustment section 4002 an instruction not to insert the optical element 33 in the optical path between the light source 1 and the diffraction grating 4.

Based on the instruction from the instruction circuit 18, the light source 1 emits a first light beam having the predetermined light power $P_{pre}$ which is modulated according to information to be recorded. The first light beam emitted from the light source 1 directly enters the light condensing section 4003 without passing through the optical element 33. Thereafter, the first light beam passes through the same route as that described above in connection with the recording operation of embodiment 2, so as to form a light spot on the optical disc 9, thereby recording information on the optical disc 9.

As in embodiments 1 and 2, the resultant recording power of light incident on the optical disc 9 is 12.5 mW (=50 mW×25% (head optical transmittance)). As described above, this recording power is permissible for a two-layer disc.

3. Reproduction Operation of Information Recording/Reproducing Apparatus 4000:

Next, a reproduction operation of the information recording/reproducing apparatus 4000 performed when the determination section 20 determines that the optical disc 9 is a one-layer disc is described.

The instruction circuit 18 issues to the light quantity adjustment section 3001 an instruction to actuate the light source 1 to produce a first light beam having a predetermined light power $P_{pre}$ required for reproducing information from a two-layer disc (e.g., about 2.5 to 4 mW). On the other hand, the instruction circuit 18 issues to the optical element controlling circuit 16 of the light beam transmission adjustment section 4002 an instruction to insert the optical element 33 in the optical path between the light source 1 and the diffraction grating 4.

Based on the instruction from the instruction circuit 18, the light source 1 emits an unmodulated first light beam having the predetermined light power $P_{pre}$. The first light beam is linearly polarized light. The first light beam enters the optical element 33. The predetermined light power $P_{pre}$ of the first light beam is adjusted by the optical element 33 so as to be about 50%-attenuated first light power $P_1$. Thereafter, the first light beam passes through the same route as that described above in connection with the recording operation of embodiment 2, so as to reach the optical disc 9. The first light beam is reflected by the optical disc 9 and guided into the second photodetector 14. The second photodetector 14 extracts an information signal, a focusing error signal, and a tracking error signal.

As in embodiments 1 and 2, the resultant reproduction power of light incident on the optical disc 9 is 0.4 mW (=about 2.5 to 4 mW×25% (head optical transmittance)×50% (transmittance of the optical element 33)). As described above, this reproduction power is permissible for a one-layer disc.

Next, a reproduction operation of the information recording/reproducing apparatus 4000 performed when the determination section 20 determines that the optical disc 9 is a two-layer disc is described.

The instruction circuit 18 issues to the light quantity adjustment section 3001 an instruction to actuate the light source 1 to produce a first light beam having predetermined light power $P_{pre}$ required for reproducing information from a two-layer disc (e.g., about 2.5 to 4 mW). On the other hand, the instruction circuit 18 issues to the optical element controlling circuit 16 of the light beam transmission adjustment section 4002 an instruction not to insert the optical element 33 in the optical path between the light source 1 and the diffraction grating 4.

Based on the instruction from the instruction circuit 18, the light source 1 emits an unmodulated first light beam having a predetermined light power $P_{pre}$. The first light beam is linearly polarized light. The first light beam emitted from the light source 1 directly enters the light condensing section 4003 without passing through the optical element 33. Thereafter, the first light beam passes through the same route as that described above in connection with the recording operation of embodiment 2, so as to reach the optical disc 9. The first light beam is reflected by the optical disc 9 and guided into the second photodetector 14. The second photodetector 14 extracts an information signal, a focusing error signal, and a tracking error signal.

As in embodiments 1 and 2, the resultant reproduction power of light incident on the optical disc 9 is 0.8 mW (=about 2.5 to 4 mW×25% (head optical transmittance)). As described above, this reproduction power is permissible for a two-layer disc.

(Embodiment 4)

In embodiments 1–3, the information recording/reproducing apparatuses 1000, 3000, 4000 of the present invention have been described while explaining the examples of recording/reproduction operations with an optical disc 9 having one or two recording layers. However, according to the present invention, the number of recording layers of the optical disc 9 is not limited to one or two. The present invention can be carried out with an optical disc having one recording layer, an optical disc having two recording layers, and an optical disc having N recording layers (N is a natural number equal to or greater than 3).

Figure 5:
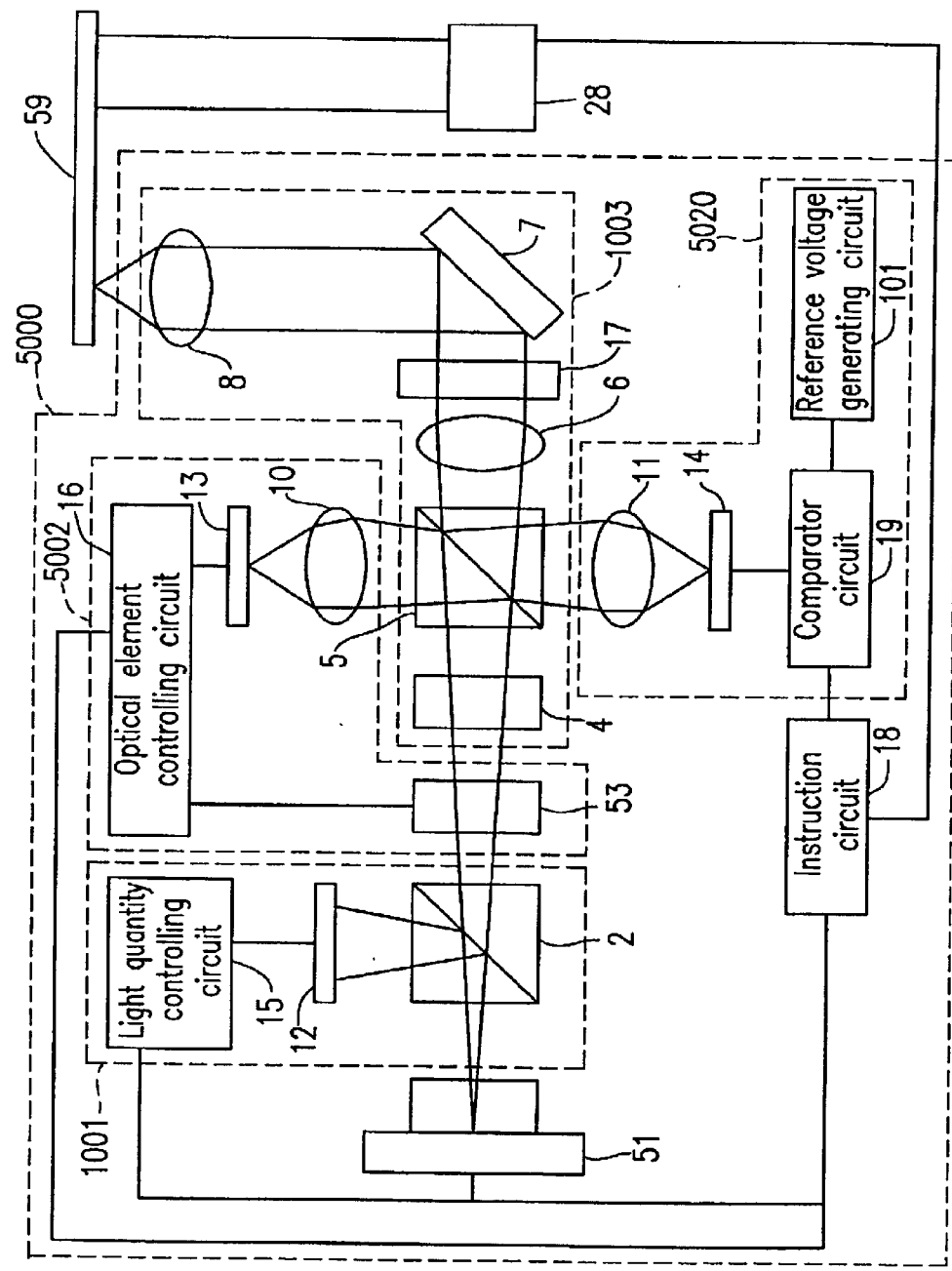
FIG. 5 shows a structure of an information recording/reproducing apparatus 5000 according to embodiment 4 of the present invention.
Figure 6:
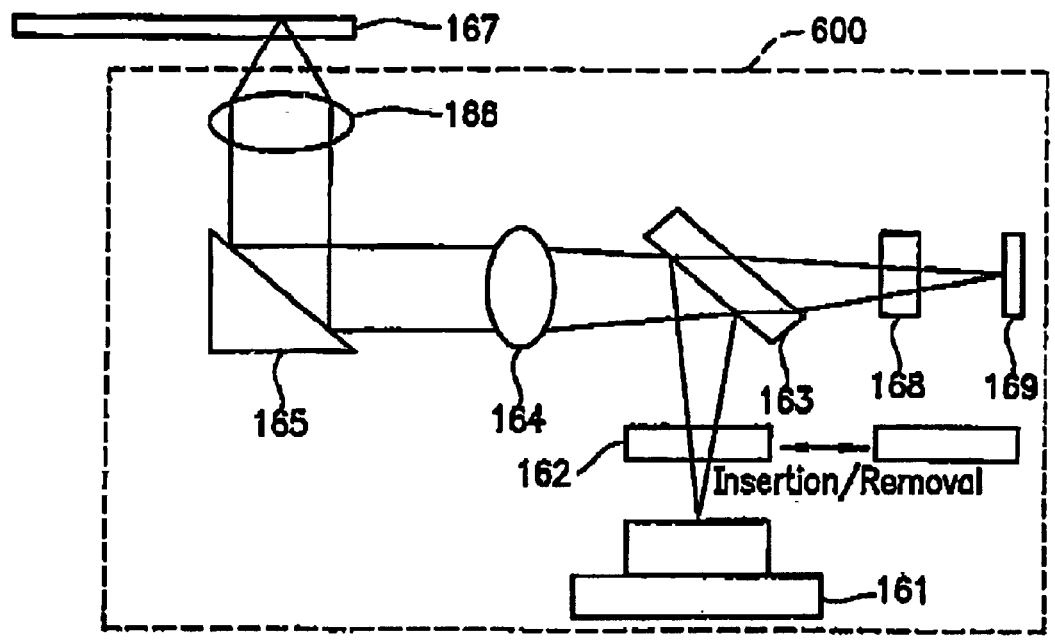
FIG. 6 shows a structure of a prior art optical head 600.

FIG. 5 shows a structure of an information recording/reproducing apparatus 5000 according to embodiment 4 of the present invention. The information recording/reproducing apparatus 5000 records information on an information recording medium (optical disc) 59 or reproduces information from the information recording medium 59. The optical disc 59 includes n recording layers (n=1, 2, . . . , N), which is hereinafter referred to as a "n-layer disc".

1. Structure of Information Recording/Reproducing Apparatus 5000:

The information recording/reproducing apparatus 5000 includes a light source 51, an instruction circuit 18, a determination section 5020, a light quantity adjustment section 1001, a light beam transmission adjustment section 5002, and a light condensing section 1003.

The structure of the information recording/reproducing apparatus 5000 is the same as that of the information recording/reproducing apparatus 1000 of embodiment 1 (FIG. 1) except for the light source 51, the light beam transmission adjustment section 5002, and the determination section 5020. In FIG. 5, like elements are indicated by like reference numerals used in FIG. 1, and detailed descriptions thereof are omitted.

The light source 51 is a semiconductor laser which can emit a light beam having a predetermined light power $P_{pre}$ required for recording information on a N-layer disc, $P_{pre}$= $25 \times 2^{N-1}$ mW (N=3, 4, . . . : N is a natural number equal to or greater than 3) and a light beam having a predetermined light power $P_{pre}$ required for reproducing information from a N-layer disc, $P_{pre}$=$2.5 \times 2^{N-1}$ mW(N=3, 4, . . . : N is a natural number equal to or greater than 3). For example, in the case where N is 3 (N=3), i.e., in the case of a three-layer disc, the light power of the light source 51 required for recording information on the three-layer disc is 100 mW (=$25 \times 2^2$), and the light power of the light source 51 required for reproducing information from the three-layer disc is 5 mW (=$2.5 \times 2^2$), because the light power required for a three-layer disc is two times greater than that required for a two-layer disc. It is appreciated from FIG. 2 showing the relationship between the laser output and the quantum noise that the relative intensity noise (RIN) of the light beam for a N-layer disc is sufficiently smaller than −125 dB/Hz.

The light beam transmission adjustment section 5002 includes an optical element 53 having a liquid crystal device and a polarization hologram, a first light condensing lens 10, a second photodetector 13, and an optical element controlling circuit 16. The transmittance of the optical element 53 is changed according to a signal from the optical element controlling circuit 16. According to embodiment 4, in order to obtain the recording/reproduction powers for any of a one-layer disc through a N-layer disc without changing the dynamic range of the light power of the light beam emitted by the light source 51, the optical element 53 is set so as to achieve the transmittance shown in TABLE 2.

TABLE 2 shows recording/reproduction power and transmittance for a one-layer disc through a N-layer disc:

TABLE 2

| Number of recording layers | recording power (mW) | reproduction power (mW) | transmittance of optical element 53 (%) |
|---|---|---|---|
| 1 | 6 (=6 × $2^0$) | 0.4 (=0.4 × $2^0$) | 100 × $(0.5)^{N-1}$ |
| 2 | 12 (=6 × $2^1$) | 0.8 (=0.4 × $2^1$) | 100 × $(0.5)^{N-2}$ |
| 3 | 24 (=6 × $2^2$) | 1.6 (=0.4 × $2^2$) | 100 × $(0.5)^{N-3}$ |
| . | . | . | . |
| . | . | . | . |
| n | 6 × $2^{n-1}$ | 0.4 × $2^{n-1}$ | 100 × $(0.5)^{N-n}$ |
| . | . | . | . |
| . | . | . | . |
| N−1 | 6 × $2^{N-2}$ | 0.4 × $2^{N-2}$ | 50 (=100 × $0.5^1$) |
| N | 6 × $2^{N-1}$ | 0.4 × $2^{N-1}$ | 100 (=100 × $0.5^0$) |

The operation of the light beam transmission adjustment section 5002 is the same as that of the light beam transmission adjustment section 1002 of embodiment 1, and detailed descriptions thereof are omitted.

In the information recording/reproducing apparatus 5000 of the present invention, the head optical transmittance of the optical system of the light condensing section 1003 is about 25%.

2. Determination Operation of Determination Section 5020:

Next, a determination operation of the determination section 5020 is described.

As described in embodiment 1, the light source 1 emits a light beam having a light power of 1.2 mW (second light beam) based on an instruction issued by the instruction circuit 18. The second light beam is used for determining the number of recording layers included in the optical disc 59.

The second light beam having a light power of 1.2 mW is reflected by the optical disc 59 so as to enter the third photodetector 14 as described in embodiment 1. The third photodetector 14 converts the light power of the received second light beam (corresponding to the quantity of reflected light) into a signal voltage $V_P$. The signal voltage $V_P$ is input to the comparator circuit 19. The comparator circuit 19 compares the signal voltage $V_P$ with a reference voltage $V_{Pthn}$ generated by the reference voltage generating circuit 101.

Herein, the reference voltage $V_{Pthn}$ may include a first reference voltage $V_{Pth1}$, a second reference voltage $V_{Pth2}$, . . . , and a (N−1)th reference voltage $V_{PthN-1}$, which satisfy the relationship of $V_{Pth1} > V_{Pth2} > \ldots > V_{PthN-1}$.

The first reference voltage $V_{Pth1}$ is set to an intermediate voltage value between a signal voltage which indicates the light quantity of the second light beam reflected by a one-layer disc and a signal voltage which indicates the light quantity of the second light beam reflected by a two-layer disc.

The second reference voltage $V_{Pth2}$ is set to an intermediate voltage value between a signal voltage which indicates the light quantity of the second light beam reflected by a two-layer disc and a signal voltage which indicates the light quantity of the second light beam reflected by a three-layer disc.

The (N-1)th reference voltage $V_{PthN-1}$ is set to an intermediate voltage value between a signal voltage which indicates the light quantity of the second light beam reflected by a (N-1)-layer disc and a signal voltage which indicates the light quantity of the second light beam reflected by a N-layer disc.

When the signal voltage $V_P$ and the reference voltage $V_{Pthn}$ satisfy the relationship $V_P > V_{Pth1}$, the comparator circuit 19 outputs to the instruction circuit 18 a signal which indicates that the optical disc 59 is a one-layer disc.

When the signal voltage $V_P$ and the reference voltage $V_{Pthn}$ satisfy the relationship $V_P < V_{PthN-1}$, the comparator circuit 19 outputs to the instruction circuit 18 a signal which indicates that the optical disc 59 is a N-layer disc.

When the signal voltage $V_P$ and the reference voltage $V_{Pthn}$ satisfy the relationship $V_{Pthk-1} > V_P > V_{Pthk}$, the comparator circuit 19 outputs to the instruction circuit 18 a signal which indicates that the optical disc 59 is a k-layer disc (k=2, 3, ..., N-1; k is a natural number).

In this way, the determination section 5020 determines the number of recording layers included in the optical disc 59. The instruction circuit 18 outputs an instruction to record information on the optical disc 59 or an instruction to reproduce information from the optical disc 59 according to the determination result of the determination section 5020.

The number of recording layers included in the optical disc 59 can be determined using a variation number m of a signal voltage as described in embodiment 1. In such a case, the comparator circuit 19 compares the variation number m with a reference variation number.

In the case of a N-layer disc, the reference variation number includes first variation number $m_1$, second variation number $m_2$, ..., Nth variation number $m_N$, which satisfy the relationship $m_1 < m_2 < ... < m_N$.

The comparator circuit 19 determines which of the first to Nth variation numbers matches the variation number m. In the case where the variation number m matches the nth variation number $m_n$ (n=1, 2, ..., N; n is a natural number), the comparator circuit 19 outputs to the instruction circuit 18 a signal which indicates that the optical disc 59 is a n-layer disc.

Alternatively, information which indicates the number of recording layers included in the optical disc 59 may be recorded in a portion of the recording region of the optical disc 59 as described in embodiment 1. The information which indicates the number of recording layers is preferably information about the reflectance of the optical disc 59. The information about the reflectance is, for example, a voltage value corresponding to the light quantity of the second light beam reflected by a n-layer disc.

In the case where the optical disc 59 originally has such information, the comparator circuit 19 only needs to determine which of the first to Nth voltage values is equal to the received signal voltage. In the case where the received signal voltage is equal to the nth voltage value, the comparator circuit 19 outputs to the instruction circuit 18 a signal which indicates that the optical disc 59 is a n-layer disc.

After the determination section 5020 determines that the optical disc 59 is a n-layer disc, a recording or reproduction operation is performed in the same manner as that described in embodiment 1, except that the optical element 53 is controlled so as to achieve the transmittance for the n-layer disc shown in TABLE 2. By the optical element 53, the first light beam for recording/reproduction, which has a light power $P_{pre}$, is adjusted so as to have a nth light power $P_n$ as shown in TABLE 3 below.

TABLE 3 shows the nth light power of the first light beam which is adjusted by the optical element 53 for recording/reproduction on a one-layer disc through a N-layer disc:

TABLE 3

| number of recording layers | nth light power (mW) |
|---|---|
| 1 | $P_{pre} \times (0.5)^{N-1}$ |
| 2 | $P_{pre} \times (0.5)^{N-2}$ |
| 3 | $P_{pre} \times (0.5)^{N-3}$ |
| . | . |
| . | . |
| . | . |
| n | $P_{pre} \times (0.5)^{N-n}$ |
| . | . |
| . | . |
| . | . |
| N-1 | $P_{pre} \times (0.5)^{1}$ |
| N | $P_{pre} \times (0.5)^{0}$ |

As described hereinabove, the predetermined light power $P_{pre}$ of the light source 51 is set to the above described value suitable for a recording or reproduction operation, while the transmittance of the optical element 53 is set to any suitable value shown in TABLE 2, whereby the first light beam having the predetermined light power $P_{pre}$ is adjusted so as to have the nth light power $P_n$ shown in TABLE 3. As a result, even when an information recording medium having N recording layers is used, the effects of the present invention described in embodiment 1 can be obtained.

In embodiment 4, the recording/reproduction power for a one-layer disc through a N-layer disc satisfies the relationships shown in TABLE 2 and TABLE 3, and the light source 51 emits a light beam having the above predetermined light power $P_{pre}$. However, the present invention is not limited to the above-described settings. According to the present invention, the recording/reproduction power for a one-layer disc through a N-layer disc may have a relationship different from the relationships shown in TABLE 2 and TABLE 3 according to the level of the predetermined light power $P_{pre}$, so long as the predetermined light power $P_{pre}$, the first light power $P_1$, the second light power $P_2$, ..., and the Nth light power $P_N$ satisfy the relationship of $P_1 < P_2 < ... < P_N \leq P_{pre}$.

Embodiment 4 can be realized even when the information recording/reproducing apparatus 3000 of embodiment 2 or the information recording/reproducing apparatus 4000 of embodiment 3 is used. In such a case also, the optical element 23 (FIG. 3) and the optical element 33 (FIG. 4) are set so as to have the transmittance shown in TABLE 1.

Further, in each of embodiments 1–4, an infinite optical system is employed in the information recording/reproducing apparatus. However, the present invention is applicable to an information recording/reproducing apparatus employing a finite optical system which does not include a collimator lens.

In an information recording/reproducing apparatus described in each of embodiments 1–4, information is recorded by a light beam, and information recorded in an information recording medium is reproduced by a light beam. However, the present invention is applicable to an information recording/reproducing apparatus wherein information is recorded using magnetism, and information recorded in an information recording medium is reproduced using magnetism.

In embodiments 1–4, the information recording medium described is an optical disc. However, the present invention is applicable to an information recording/reproducing apparatus for recording information on or reproducing information from an information recording medium which is different from an optical disc but has a similar functions as those of the optical disc, such as a card-shaped information recording medium, etc.

An information recording/reproducing apparatus according to the present invention includes: a light source for emitting a first light beam having a predetermined light power $P_{pre}$; a determination section for determining whether the information recording medium has one recording layer or two recording layers; a light beam transmission adjustment section for adjusting the quantity of the first light beam transmitted therethrough based on a determination result of the determination section; and a light condensing section for condensing the first light beam transmitted through the light beam transmission adjustment section on the information recording medium.

When the determination section determines that the information recording medium has one recording layer, the light beam transmission adjustment section adjusts the predetermined light power $P_{pre}$ so as to be a first light power $P_1$. When the determination section determines that the information recording medium has two recording layers, the light beam transmission adjustment section adjusts the predetermined light power $P_{pre}$ so as to be a second light power $P_2$. The predetermined light power $P_{pre}$, the first light power $P_1$, and the second light power $P_2$ satisfy the relationship of $P_1 < P_2 \leq P_{pre}$.

The light power of a light beam incident on an information recording medium having one recording layer is set so as to be smaller than the light power of a light beam incident on an information recording medium having two recording layers. With such an arrangement, information recorded on the information recording medium having one recording layer can be prevented from being damaged by the light beam. Furthermore, since the light power is not adjusted in the light source but in the light beam transmission adjustment section, the amount of quantum noise included in a light beam emitted by the light source can be kept small.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An information recording/reproducing apparatus for recording information on an information recording medium having one or two recording layers and for reproducing the information recorded on the information recording medium, comprising:

a light source for emitting a first light beam having a predetermined light power $P_{pre}$;

a determination section for determining whether the information recording medium has one recording layer or two recording layers;

a light beam transmission adjustment section for adjusting the quantity of the first light beam transmitted therethrough based on a determination result of the determination section; and a light condensing section for condensing the first light beam transmitted through the light beam transmission adjustment section on the information recording medium, wherein when the determination section determines that the information recording medium has one recording layer, the light beam transmission adjustment section adjusts the predetermined light power $P_{pre}$ so as to be a first light power $P_1$, when the determination section determines that the information recording medium has two recording layers, the light beam transmission adjustment section adjusts the predetermined light power $P_{pre}$ so as to be a second light power $P_2$, and the predetermined light power $P_{pre}$, the first light power $P_1$, and the second light power $P_2$ satisfy the relationship of $P_1 < P_2 \leq P_{pre}$.

2. An information recording/reproducing apparatus according to claim 1, wherein:

the light source emits a second light beam having a light power smaller than the predetermined light power $P_{pre}$ instead of the first light beam; and the determination section detects a light quantity of the second light beam which is transmitted through the light beam transmission adjustment section and reflected by the information recording medium, and determines whether the information recording medium has one recording layer or two recording layers according to the reflected light quantity.

3. An information recording/reproducing apparatus according to claim 2, wherein:

the determination section compares a signal voltage $V_P$ indicating the reflected light quantity with a reference voltage $V_{Pth}$ so as to determine whether the information recording medium has one recording layer or two recording layers;

when the signal voltage $V_P$ and the reference voltage $V_{Pth}$ satisfy the relationship of $V_P > V_{Pth}$, the determination section determines that the information recording medium has one recording layer, and when the signal voltage $V_P$ and the reference voltage $V_{Pth}$ satisfy the relationship of $V_P < V_{Pth}$, the determination section determines that the information recording medium has two recording layers.

4. An information recording/reproducing apparatus according to claim 2, wherein:

the determination section compares a variation number m of a signal voltage indicating the reflected light quantity with a reference variation number so as to determine whether the information recording medium has one recording layer or two recording layers, the reference variation number including a first reference variation number $m_1$ and a second reference variation number $m_2$ ($m_1 < m_2$);

when the variation number m and the reference variation number satisfy the relationship of $m = m_1$, the determination section determines that the information recording medium has one recording layer, and when the variation number m and the reference variation number satisfy the relationship of $m = m_2$, the determination section determines that the information recording medium has two recording layers.

5. An information recording/reproducing apparatus according to claim 2, wherein:

the determination section compares a signal voltage indicating the reflected light quantity with a first signal voltage and a second signal voltage so as to determine whether the information recording medium has one recording layer or two recording layers;

the first signal voltage indicates a light quantity of the second light beam reflected by the information recording medium having one recording layer;

the second signal voltage indicates a light quantity of the second light beam reflected by the information recording medium having two recording layers;

when the signal voltage is equal to the first signal voltage, the determination section determines that the information recording medium has one recording layer, and when the signal voltage is equal to the second signal voltage, the determination section determines that the information recording medium has two recording layers.

6. An information recording/reproducing apparatus according to claim 1, wherein the light beam transmission adjustment section includes a liquid crystal device and a polarization hologram.

7. An information recording/reproducing apparatus according to claim 1, wherein the light beam transmission adjustment section includes a liquid crystal device and a polarized beam splitter.

8. An information recording/reproducing apparatus according to claim 1, wherein the light beam transmission adjustment section includes an optical filter.

9. An information recording/reproducing apparatus according to claim 1, wherein the light source is a semiconductor laser which emits light at a wavelength within a wavelength region from green to ultraviolet.

10. An information recording/reproducing apparatus according to claim 1, wherein the light source is a semiconductor laser which emits light at a wavelength within a blue wavelength region.

11. An information recording/reproducing apparatus for recording information on an information recording medium having one, two, or N recording layers (N>2; N is a natural number) and for reproducing the information recorded on the information recording medium, comprising:

a light source for emitting a first light beam having a predetermined light power $P_{pre}$;

a determination section for determining the number of recording layers included in the information recording medium;

a light beam transmission adjustment section for adjusting the quantity of the first light beam transmitted therethrough based on a determination result of the determination section; and a light condensing section for condensing the first light beam transmitted through the light beam transmission adjustment section on the information recording medium, wherein when the determination section determines that the information recording medium has n recording layers (n=1, 2, . . . , N; n is a natural number), the light beam transmission adjustment section adjusts the predetermined light power $P_{pre}$ so as to be a nth light power $P_n$, and the predetermined light power $P_{pre}$ and the nth light power $P_n$ satisfy the relationship of $P_1<P_2< \ldots <P_n< \ldots <P_{N-1} \leq P_N$.

12. An information recording/reproducing apparatus according to claim 11, wherein:

the light source emits a second light beam having a light power smaller than the predetermined light power $P_{pre}$ instead of the first light beam; and the determination section detects a light quantity of the second light beam which is transmitted through the light beam transmission adjustment section and reflected by the information recording medium, and determines the number of recording layers included in the information recording medium according to the reflected light quantity.

13. An information recording/reproducing apparatus according to claim 12, wherein:

the determination section compares a signal voltage $V_P$ indicating the reflected light quantity with a reference voltage $V_{Pthn}$ so as to determine the number of recording layers included in the information recording medium;

the reference voltage $V_{Pthn}$ includes a first reference voltage $V_{Pth1}$, a second reference voltage $V_{Pth2}$, . . . , and a (N-1)th reference voltage $V_{PthN-1}$, which satisfy the relationship of $V_{Pth1}>V_{Pth2}> \ldots >V_{PthN-1}$;

when the signal voltage $V_P$ and the reference voltage $V_{Pthn}$ satisfy the relationship of $V_P>V_{Pth1}$, the determination section determines that the information recording medium has one recording layer, when the signal voltage $V_P$ and the reference voltage $V_{Pthn}$ satisfy the relationship of $V_P<V_{PthN-1}$, the determination section determines that the information recording medium has N recording layers, and when the signal voltage $V_P$ and the reference voltage $V_{Pthn}$ satisfy the relationship of $V_{Pthk-1}>V_P>V_{Pthk}$, the determination section determines that the information recording medium has k recording layers (k=2, 3, . . . , N-1; k is a natural number).

14. An information recording/reproducing apparatus according to claim 12, wherein:

the determination section compares a variation number m of a signal voltage indicating the reflected light quantity with a reference variation number so as to determine the number of recording layers included in the information recording medium;

the reference variation number includes a first reference variation number $m_1$, a second reference variation number $m_2$, . . . , and a Nth reference variation number $m_N$, which satisfy the relationship of $m_1<m_2< \ldots <m_N$; and when the variation number m of the signal voltage is equal to a nth variation number $m_n$ (n=1, 2, . . . , N; n is a natural number) among the first to Nth variation numbers, the determination section determines that the information recording medium has n recording layers.

15. An information recording/reproducing apparatus according to claim 12, wherein:

the determination section compares a signal voltage indicating the reflected light quantity with first to Nth signal voltages so as to determine the number of recording layers included in the information recording medium;

the nth signal voltage (n=1, 2, . . . , N; n is a natural number) indicates a light quantity of the second light beam reflected by the information recording medium having n recording layers; and when the signal voltage is equal to the nth signal voltage, the determination section determines that the information recording medium has n recording layers.

16. An information recording/reproducing apparatus according to claim 11, wherein the light beam transmission adjustment section includes a liquid crystal device and a polarization hologram.

17. An information recording/reproducing apparatus according to claim 11, wherein the light beam transmission adjustment section includes a liquid crystal device and a polarized beam splitter.

18. An information recording/reproducing apparatus according to claim 11, wherein the light beam transmission adjustment section includes an optical filter.

19. An information recording/reproducing apparatus according to claim 11, wherein the light source is a semiconductor laser which emits light at a wavelength within a wavelength region from green to ultraviolet.

20. An information recording/reproducing apparatus according to claim 11, wherein the light source is a semiconductor laser which emits light at a wavelength within a blue wavelength region.

* * * * *